(12) United States Patent
Diebold et al.

(10) Patent No.: US 7,909,899 B2
(45) Date of Patent: Mar. 22, 2011

(54) METHOD AND APPARATUS FOR AUTOMATED, MODULAR, BIOMASS POWER GENERATION

(75) Inventors: James P. Diebold, Lakewood, CO (US);
Arthur Lilley, Finleyville, PA (US);
Kingsbury III Browne, Golden, CO (US); Robb Ray Walt, Aurora, CO (US); Dustin Duncan, Littleton, CO (US); Michael Walker, Longmont, CO (US); John Steele, Aurora, CO (US);
Michael Fields, Arvada, CO (US);
Trevor Smith, Lakewood, CO (US)

(73) Assignee: Community Power Corporation, Littleton, CO (US)

( * ) Notice: Subject to any disclaimer, the term of this patent is extended or adjusted under 35 U.S.C. 154(b) by 975 days.

(21) Appl. No.: 11/427,231

(22) Filed: Jun. 28, 2006

(65) Prior Publication Data

US 2007/0006528 A1    Jan. 11, 2007

Related U.S. Application Data

(60) Provisional application No. 60/694,156, filed on Jun. 28, 2005.

(51) Int. Cl.
*C01B 3/36* (2006.01)
*C01B 3/24* (2006.01)
*C10K 3/06* (2006.01)
*C10J 3/00* (2006.01)
*B01J 7/00* (2006.01)

(52) U.S. Cl. ............ 48/197 R; 48/61; 48/202; 48/210; 423/650

(58) Field of Classification Search .......... 48/61, 197 R
See application file for complete search history.

(56) References Cited

U.S. PATENT DOCUMENTS

| | | | | |
|---|---|---|---|---|
| 3,496,629 A | * | 2/1970 | Martucci et al. | 228/168 |
| 3,519,539 A | * | 7/1970 | Schulte | 202/117 |
| 3,520,649 A | | 7/1970 | Tomany et al. | |
| 3,653,189 A | | 4/1972 | Miyake et al. | |
| 3,841,851 A | * | 10/1974 | Kaiser | 48/111 |
| 4,011,059 A | * | 3/1977 | Daly et al. | 48/85.2 |

(Continued)

FOREIGN PATENT DOCUMENTS

WO    WO 9632163 A1 * 10/1996

OTHER PUBLICATIONS

Agarwal, A.T., "Design Guide for Dust Collectors," Chem. Eng., Feb. 2005, p. 42-49.

(Continued)

*Primary Examiner* — Alexa D Neckel
*Assistant Examiner* — Matthew J Merkling
(74) *Attorney, Agent, or Firm* — Kilpatrick Townsend & Stockton, LLP

(57) ABSTRACT

Method and apparatus for generating a low tar, renewable fuel gas from biomass and using it in other energy conversion devices, many of which were designed for use with gaseous and liquid fossil fuels. An automated, downdraft gasifier incorporates extensive air injection into the char bed to maintain the conditions that promote the destruction of residual tars. The resulting fuel gas and entrained char and ash are cooled in a special heat exchanger, and then continuously cleaned in a filter prior to usage in standalone as well as networked power systems.

20 Claims, 9 Drawing Sheets

U.S. PATENT DOCUMENTS

| | | | |
|---|---|---|---|
| 4,184,437 | A | 1/1980 | Mallek et al. |
| 4,191,114 | A | 3/1980 | Saitoh et al. |
| 4,198,212 | A * | 4/1980 | Tsao ............................... 48/210 |
| 4,213,404 | A | 7/1980 | Spaulding |
| 4,278,064 | A | 7/1981 | Regueiro |
| 4,402,738 | A * | 9/1983 | Akio ............................... 75/687 |
| 4,463,686 | A | 8/1984 | Premel |
| 4,481,022 | A | 11/1984 | Reier |
| 4,498,909 | A | 2/1985 | Milner et al. |
| 4,552,655 | A | 11/1985 | Granot |
| 4,562,795 | A * | 1/1986 | Kraus ........................... 122/1 R |
| 4,583,992 | A | 4/1986 | Rogers |
| 4,599,953 | A | 7/1986 | Gould |
| 4,600,415 | A | 7/1986 | Barton |
| 4,643,110 | A | 2/1987 | Lisowyj et al. |
| 4,655,968 | A | 4/1987 | Queiser et al. |
| 4,750,437 | A | 6/1988 | Rouse |
| 4,871,014 | A | 10/1989 | Sulzberger |
| 4,881,949 | A | 11/1989 | Brungel et al. |
| 5,059,404 | A | 10/1991 | Mansour et al. |
| 5,226,927 | A | 7/1993 | Rundstrom |
| 5,279,234 | A | 1/1994 | Bender et al. |
| 5,311,830 | A | 5/1994 | Kiss |
| 5,318,602 | A | 6/1994 | Juch |
| 5,322,534 | A | 6/1994 | Kaiser |
| 5,553,556 | A | 9/1996 | Kruger |
| 5,560,820 | A | 10/1996 | Consolo |
| 5,595,655 | A | 1/1997 | Steiner |
| 5,690,710 | A | 11/1997 | Stephan |
| 6,024,032 | A | 2/2000 | Sharpe |
| 6,134,385 | A * | 10/2000 | Chen et al. .................... 392/416 |
| 6,182,584 | B1 | 2/2001 | Gaudio |
| 6,202,577 | B1 | 3/2001 | Boguslavsky et al. |
| 6,279,491 | B1 | 8/2001 | Takahashi et al. |
| 6,283,048 | B1 | 9/2001 | Fujinami et al. |
| 6,360,679 | B1 | 3/2002 | Clarke |
| 6,422,159 | B1 | 7/2002 | Hunter |
| 6,579,336 | B1 | 6/2003 | Duffy et al. |
| 6,647,903 | B2 | 11/2003 | Ellis |
| 6,991,665 | B1 | 1/2006 | Allen et al. |
| 2002/0069798 | A1* | 6/2002 | Aguadas Ellis ............... 110/229 |
| 2003/0176884 | A1 | 9/2003 | Berrada |

OTHER PUBLICATIONS

Bergmann, L., "Beating the Baghouse Blues," Chem. Eng., Jan. 2001, pp. 65-67.

Chemical Engineering, "Fouling Strikes Out," Oct. 1999, p. 45.

Diebold, J.P. et al., "The BioMax® 15: the automation, integration and pre-commercial testing of an advanced down-draft gasifier and engine/gen set," cplpress Science Publishers, 2006, pp. 894-907.

Pell, M et al., "Gas-Solids Operations and Equipment," in Perry's Chemical Engineer's Handbook, 7th ed., McGraw-Hill, pp. 17-47.

Reed, T. B., et al., "Handbook of Biomass Downdraft Gasifier Engine Systems," The Biomass Energy Foundation Press, Golden, CO., 1988, pp. 37-45.

Reed, T. B., et al., "Superficial Velocity—The Key to Downdraft Gasification," presented at the 4th Biomass Conference of the Americas, Oakland, CA, Aug. 29, 1999, pp. 1-9.

Rohsenow, W. M., et al., Handbook of Heat Transfer, McGraw-Hill, NY, 3rd Edition, 1998, pp. 17.2-17.7.

www.klarex.com, Klarex® Technology -self -cleaning heat exchangers, printed Jun. 16, 2005, 9 pages.

Bui, T., et al., "Multi-stage Reactor for Thermal Gasification of Wood," Energy vol. 19, No. 4, Elsevier, 1994, pp. 397-404.

Gumz, W., Fig. 26, Gas composition vs. temperature in a gas producer, from Gumz, W., Gas Producers and Blast Furnaces, Wiley, New York (1950), adapted from W. Horak, Z. Oester Ver. Gas-u. Wasserfachm, 74, No. 11-12, 1933, pp. 170-180.

Makunda, H.S., et al., "Gasifiers and combustors for biomass-technology and field studies," Energy for Sustainable Development vol. 1, No. 3, Sep. 1994, pp. 27-38.

Reed, T.B. et al., "Chapter 2: History, Current developments, and Future Directions," Handbook of Biomass Downdraft Gasifier Engine Systems, Solar Energy Research Institute, Golden Colorado (Now National Renewable Energy Laboratory), Document No. SERI/SP-271-3022 DE88001135, Mar. 1988, UC Category: 245, pp. 6-8.

Reed, T.B. et al., "Chapter 4," Handbook of biomass Downdraft Gasifier Engine Systems, Solar Energy Research Institute, Golden, Colorado (Now National Renewable Energy Laboratory), Document No. SERI/SP-271-3022, DE88001135, Mar. 1988, UC Category: 245, p. 22.

Reed, T.B. et al., "Chapter 5: Gasifier Designs," Handbook of Biomass Downdraft Gasifier Engine Systems, Solar Energy Research Institute, Golden, Colorado (Now National Renewable Energy Laboratory), Document No. SERI/SP-271-3022, DE88001135, Mar. 1988, UC Category: 245, pp. 30-47.

* cited by examiner

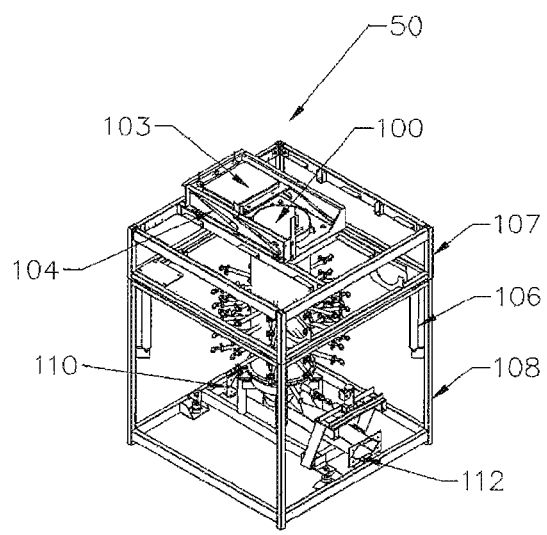
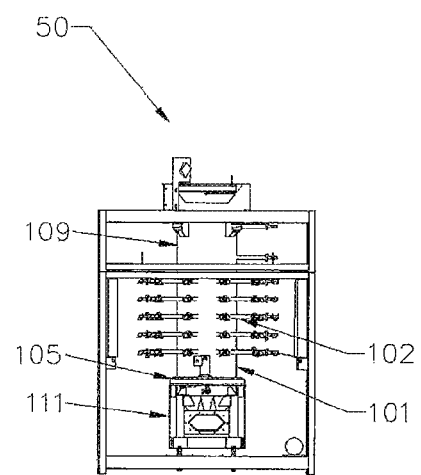
Figure 1A
Figure 1B

METHOD AND APPARATUS FOR AUTOMATED, MODULAR, BIOMASS POWER GENERATION

CROSS-REFERENCES TO RELATED APPLICATIONS

This application claims the benefit of U.S. Provisional Application No. 60/694,156, filed Jun. 28, 2005. This application is also related to U.S. patent application Ser. No. 11/427,221, filed Jun. 28, 2006. The entire contents of each of these applications are incorporated herein by reference.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of SBIR Contract No. DE-FG02-03ER83630 and SMB Contract No. ZDH-9-29047-01, both awarded by the U.S. Department of Energy.

BACKGROUND OF THE INVENTION

Embodiments of the invention relate generally to the field of downdraft biomass gasification. More specifically, embodiments of the invention relate to biomass gasification in modular, portable, distributed biomass gasifiers that produce a low tar fuel gas with low emissions, and no toxic waste streams.

Gasification typically involves the oxidization or conversion of carbon-based biomass feedstock to gas or other usable fuel. The resulting gas can be used to generate electricity, or as a raw material to produce chemicals and liquid fuels. Typically, feedstock such as wood chips or other biomass is screened to remove undesirable material. The feed is dried, and processed in a gasifier to produce fuel.

Commonly used techniques for biomass gasification often are hampered by the inability to control the variables of gasification, and thus result in the generation of a fuel gas contaminated with high levels of tars. In many current gasifier systems such high levels of tars require the use of gas clean-up systems that most often incorporate water-based scrubbers and/or large sawdust or sand-bed filters. These components can add cost, complexity, and increase the size of the system footprint. Furthermore, the tar-laden water effluent, or large volumes of sand or sawdust contaminated with tars, often need to be cleaned up or treated as a hazardous waste stream in many countries in general, and the USA in particular.

What is more, current approaches for gasification often do not provide effective gas cooling, which can lead to unclean fuel gas. The cooling of the hot producer gas is a difficult heat transfer problem from a practical point of view. Unequal temperatures and the resulting thermal expansion and contraction of different parts of a tube-and-shell heat exchanger often require provisions for stress relief, when operating with large temperature differences between the two fluid flows. Current techniques also often involve water scrubbing to remove residual tars and chars from producer gases. Unfortunately, these materials are very fine aerosols and particles, which are difficult to remove by this method.

Another shortcoming of distributed fuel gas generation systems is the inability to control them via a communications network to monitor operations and optimize performance while increasing the ability to diagnose and implement rapid repairs. This inability to monitor and control fuel gas generation via a communications network, either local or wide area, can increase the labor costs of operation while reducing revenues due to increased times to recover from system outages.

What is needed are systems and methods for gasification that can accurately control variables of gasification, provide effective gas cooling, operate without the use of scrubbing liquid, and accommodate computer control of a networked group of modular biopower systems. Embodiments of the present invention provide solutions to at least some of these needs.

BRIEF SUMMARY OF THE INVENTION

Embodiments of the present invention provide gasification systems and methods well suited for automation and control of various gasification variables such as cooling and filtering. Also provided are techniques for controlling the pyrolysis zone location, and including char air injection in gasification chambers. Grate components can be moved as needed to carry out various functions, and gasifiers can be vibrated to create desired conditions for gas production. In some embodiments, all char is passed through a heat exchanger, and in some embodiments char adsorbs tars. Heat exchanger tubes are configured for free movement, filters are provided, and automation aspects, including the ability to use the internet for remote operation, are disclosed.

In a first aspect embodiments of the present invention provide an automated method for converting a solid, carbonaceous material to a low tar fuel gas within a gasification reactor chamber. The method can include introducing the carbonaceous material into the chamber, transforming a first portion of the carbonaceous material into a char material at a flaming pyrolysis zone, controlling a plurality of temperatures along a length of the chamber by injecting oxidizing gas at a plurality of levels in the gasification reactor chamber, controlling an amount of the oxidizing gas injected from at least one of the plurality of levels, varying a location of the flaming pyrolysis zone within the chamber by increasing or decreasing an amount of oxidizing gas injected upstream or downstream of the pyrolysis zone, controlling a porosity of the char material and a second portion of the carbonaceous material in the gasification reactor chamber by applying at least one force to the chamber; and converting the char material and the second portion of the carbonaceous material to the low tar fuel gas within the gasification reactor chamber. The method can also include controlling the location of the flaming pyrolysis zone to maximize tar reduction for a prescribed range of fuel gas flow rates. The method can also include controlling the porosity of the char material and the second portion of the carbonaceous material to maximize tar reduction with a minimum of pressure drop for a prescribed range of fuel gas flow rates. In some cases, the carbonaceous material includes a bulk density of greater than about 3 pounds per cubic foot. In some cases, the carbonaceous material includes a woody biomass, a non-woody biomass, a cellulosic product, a cardboard, a fiber board, a paper, a plastic, or a food stuff. The method may also include controlling the amount of oxidizing gas injected in the gasification chamber at two or more levels with one or more variable speed fans or blowers, with one or more valves, or with one or more flow restrictors.

In another aspect, embodiments of the present invention provide an automated method for removing a tar from a fuel gas generating device. The method can include reducing an uncombusted solid material to a particle that is sized for entrainment in a flowing fuel gas downstream of a gasification reactor chamber, entraining the particle in the flowing fuel gas to permit the particle to scour a surface of a fuel gas generating device that is prone to buildup of the tar, controlling a temperature of the flowing fuel gas to promote condensation and adsorption of the tar on a surface of the entrained particle in the flowing fuel gas, so as to form a tar-laden particle, and collecting and discharging the tar-laden particle from the fuel gas generating device. The temperature of the flowing fuel gas can be controlled by a heat exchanger, a heater, a blower, a fan, and the like. In some cases, the method can also include removing the tar-laden particle from the flowing fuel gas.

In still another aspect, embodiments of the present invention provide an automated gasification reactor apparatus for converting a solid, carbonaceous material to a fuel gas. The apparatus can include a heat source configured to ignite the solid, carbonaceous material to form a fuel gas, a plurality of injection tubes penetrating a gasification reactor wall at more than two levels, such that the injection tubes are configured to deliver an oxidizing gas to an interior of a gasification reactor chamber at varying distances from the gasification reactor wall in a pattern that uniformly distributes the oxidizing gas within a fuel bed. The apparatus can also include a moveable grate located at a downstream outlet of the gasification reactor chamber, the grate configured to crush frangible char or ash to a particle that is sized to pass through a mesh screen. The plurality of injection tubes can include a plurality of nozzles configured to deliver the oxidizing gas in a direction generally non-perpendicular to a direction of flow of the fuel gas. The heat source for ignition can include an electric resistance heater or a gas burner, for example. In some cases, the apparatus also includes a blower means configured to inject the oxidizing gas into the gasification chamber. The blower means can include a single blower having a plurality of control valves, or a plurality of blowers. The plurality of nozzles can be located in a plurality of injector tubes protruding inwardly to the gasification reactor. The apparatus can also include a means for moving the grate, such as a motor, an actuator, a solenoid, and the like. In some cases, the apparatus also includes a vibrating means configured to control a porosity of a combined char material and carbonaceous material by collapsing bridges and channels therein. In some cases, the apparatus also includes a tube-and-shell heat exchanger configured to control a temperature of a tar-laden gas to promote collection of a tar on a surface of an entrained particle in a flowing gas stream. A tube within the tube-and-shell heat exchanger can be configured to withstand extreme differential expansion caused by cooling of the flowing gas stream, and the tube can be individually stress-relieved through a seal in a tube sheet. The apparatus may also include a filter to remove the tar-laden particle from the flowing gas stream.

In another aspect, embodiments of the present invention provide an integrated, automated power system. The power system can include a process automation controller in operative association with a fuel gasification reactor, a gas cooler, a gas filter, a fossil-fueled energy conversion device, and a process automation controller. The energy conversion device can be configured to convert a low tar fuel gas to an energy output such as a mechanical energy output, an electrical energy output, a thermal energy output, or a chemical energy output. In some cases, the gasification reactor, gas cooler, or gas filter is adapted to supply a fuel gas to the fossil-fueled energy conversion device. In some cases, the fossil-fueled energy conversion device includes a solid oxide fuel cell, a Stirling engine, a gas turbine, an internal combustion engine, a thermo-electric generator, a scroll expander, a gas burner, a gas-to-liquid device, or a thermo-photovoltaic device. The fossil-fueled energy conversion device can be configured to generate energy output from a low tar fuel gas. In some aspects, the fossil-fueled energy conversion device includes a compression-ignition internal combustion engine configured to generate energy output from a low tar fuel gas. The process automation controller can be part of a network that includes, for example, a distributed client server, a telecommunications link, and a central client server. Embodiments of the present invention also encompass automated, modular, distributed architectures. For example, a distributed architecture can include a central client server and at least one integrated, automatic power system. The integrated automatic power system can include a process automation controller in operative association with a fuel gasification reactor, a gas cooler, a gas filter, a fossil-fueled energy conversion device, and a process automation controller.

In some aspects, embodiments of the present invention provide methods for converting solid, carbonaceous material to a low tar fuel gas. Methods can include, for example, providing means to control the heating of surfaces (and in some cases all surfaces) downstream of a gasification reactor chamber to a predetermined temperature above the dew point of water, to cease heating the downstream surfaces, and to initiate the gasification process using a heat source to ignite and combust the char stored in the reactor chamber. Methods can also include providing means to control injection of oxidizing gas at several levels along the axial length of the reactor chamber filled with the solid, carbonaceous material, and providing means to control injection of the oxidizing gas to the reactor chamber in a manner to vary in a continuous manner the ratio of the injected oxidizing gas to that from ambient oxidizing air received from any other entrances to the gasification reactor chamber from 0% injected oxidizing gas to 100% ambient air, or from 100% injected oxidizing gas to 0% ambient air. Methods may also include controlling injection of the oxidizing gas to the reactor chamber in a manner to vary the ratio of the oxidizing gas injected at a single axial level from 0% to 100% of the total oxidizing gas required, controlling injection of the oxidizing gas at several levels, and injecting the oxidizing gas in a manner to increase, or decrease, the temperature of the carbonaceous material located downstream of the nozzles. Further, methods may include controlling injection of the oxidizing gas at the plurality of levels, injecting the oxidizing gas in a manner to create a plurality of heated plumes downstream of the injection point and generally parallel to the vertical axis of the chamber, and controlling the movement of the flaming pyrolysis zone in an upstream or downstream direction within the reactor chamber by controlling the fraction of total oxidizing gas injected upstream or downstream of the flaming pyrolysis zone. Methods may also include controlling the movement of the flaming pyrolysis zone in a downstream direction within the reactor chamber by controlling the removal of char and ash from the furthest downstream portion of the fuel bed, and increasing fuel-bed bulk density (as measured in weight per unit volume) by controlling forces applied to the external structure of the gasification reactor of a sufficient magnitude, frequency and duration to cause the materials in the fuel bed to move to occupy a smaller volume following the application of the forces. Methods may further include supplying solid, carbonaceous material into the chamber as needed to replenish an amount of the solid, carbonaceous material that has been reduced in volume by combustion of the carbonaceous materials, collapse of void spaces, controlled increase in fuel-bed bulk density, or removal of char and/or ash from the reactor chamber, and outputting the renewable fuel gas from the reactor chamber.

In some aspects, the cross sectional area of the gasification chamber, or the length of the gasification chamber, or both, can be selected to maximize tar reduction within a prescribed range of fuel gas flow rates. The low tar fuel gas can be made from a solid carbonaceous fuel generally having a bulk density of greater than 3 pounds per cubic foot. For example, shredded army trash can have a bulk density of 6 pounds per cubic foot. In some cases, the low tar fuel gas can be made from the solid carbonaceous materials such as woody biomass; non-woody biomass; cellulosic products such as cardboard, fiber board, and paper; certain plastics and food stuffs; and mixtures thereof. The source of ignition heat can be applied near the bottom of the solid carbonaceous fuel bed at a point upstream of the output of the gasification chamber. The flow of the oxidizing gas may be controlled at two or more levels with one or more variable speed fans or blowers, or by one or more valves, or flow restrictors. In some aspects, the majority of uncombusted solid materials (char, ash, dirt, pebbles, etc) exit the gasification chamber as particles entrained in the flowing fuel gas. Entrained char, ash, dirt, and pebbles in the gases can scour exposed heat-exchange surfaces to minimize fouling accumulations. In some aspects, the fuel gases are cooled with a heat exchanger and then filtered to remove particulates. The entrained materials in the cooled fuel gas can be accumulated on filter surfaces in a manner that can be subsequently removed for disposal.

In yet another aspect, embodiments of the present invention provide a gasification reactor for converting solid, carbonaceous material to a low tar fuel gas. The apparatus can include, for example, an entrance port through which the solid carbonaceous material is delivered, a chamber within the gasification reactor to receive the solid carbonaceous material, a heat source to ignite the solid carbonaceous materials, and a plurality of oxidant-injection tubes penetrating the gasification reactor walls through which oxidizing gas flows to the interior of the chamber. Several levels of the plurality of oxidant-injection tubes can penetrate the gasification reactor walls and each level can be arranged successively in a direction from upstream to downstream of the flow of the fuel gas. The apparatus can also include a plurality of tubes or nozzles arranged to deliver oxidizing gas at varying distances from the gasification reactor wall in a pattern that uniformly distributes the oxidizing gas within the fuel bed. A plurality of nozzles can deliver the oxidizing gas in a direction generally non-perpendicular to the general direction of flow of the fuel gas. The apparatus can also include a gasification reactor having an interior chamber in which the solid carbonaceous material is oxidized, means to apply a variable external force to the gasification reactor, and a grate located at the downstream outlet of the chamber that is moveable to crush frangible char and ash particles to a particle size that allows the crushed char and ash to pass through a mesh screen. In some aspects, the heat source for ignition is an electric resistance heater or a gas burner. The means of delivering oxidizing gas into the gasification chamber can be achieved by a single blower, or a plurality of blowers. The plurality of nozzles can be located in a plurality of oxidant injection tubes protruding inwardly to the gasification reactor. The means to apply the variable external force can include a vibrator, solenoid, or the like. In some aspects, a tube-and-shell heat exchanger is used to cool the fuel gases. Each tube in a tube-and-shell heat exchanger may be allowed to thermally expand and contract independently of the other tubes in the axial direction through a seal in a tube-sheet. In some aspects, a permeable filter removes the char and ash entrained in the fuel gases produced in the gasification chamber. The gasifier and heat exchanger can be spring mounted to avoid inducing stresses into the hot mechanical components that could damage them. A gravity-powered gate can be used to immediately cut off the flow of oxidizing gas and feedstock to the gasification chamber.

In still another aspect, embodiments of the present invention provide an automated, modular system for converting solid, carbonaceous material to a low tar fuel gas. The system can include, for example, a discrete, automated subsystem to deliver the solid, carbonaceous fuel to a gasification reactor, a discrete, automated subsystem to convert the solid, carbonaceous to the low tar fuel gas, a discrete, automated subsystem to reduce the temperature of the low tar fuel gas to a pre-determined level above the dew point of water, and a discrete, automated subsystem to remove solid particulates, and tars, from the fuel gas, and to discharge the solid particulates to a bin for collection in a manner that the flow of the fuel gas is free from disruption. The system may also include a process automation controller to operate the integrated system resulting from the interconnection of the discrete automated subsystems, and a means to include, or exclude, discrete automated subsystems to form unique automated, modular systems that deliver the low tar fuel gas in a manner that meets the needs of different types of gas-based energy conversion devices. Tars contained within the fuel gas can be below approximately 25 parts per million. Different types of gas-based energy conversion devices include a solid oxide fuel cell, Stirling engine, micro-turbine, internal combustion engine, thermo-electric generator, scroll expander, gas burner, thermo-photovoltaic device, or gas-to-liquid device. In some cases, the output gases of two, or more, gasification reactors can be combined to supply low tar fuel gas to downstream subsystems comprised of gas coolers, gas cleaners and gas-based energy conversion devices. In some integrated system embodiments, low tar fuel gas can substitute for up to 100% of a fossil fuel in a solid oxide fuel cell, Stirling engine, gas turbine, spark ignited internal combustion engine, thermo-electric generator, scroll expander, gas burner, gas-to-liquid device, or thermo-photovoltaic device. Similarly, a low tar fuel gas can substitute for a significant fraction of a fossil fuel in a compression-ignition internal combustion engine. In some cases, each tube in a tube-and-shell heat exchanger is allowed to thermally expand and contract independently of the other tubes in the axial direction through a seal in a tube-sheet. The individual tube seals can be located in the tube-sheet located at the end of the heat exchanger having the lower temperatures. The seal can be made with an O-ring, quad ring, or other pre-shaped device that has a similar function. The seal can be made with packing material and a packing gland. In some embodiments, the fluid on the shell side enters the heat exchanger near the tube-side exit and flows in counter-current flow relative to the tube-side fluid flow to the tube-side fluid entrance. In some embodiments, the fluid on the shell side enters at one location near the middle of the heat exchanger where the shell fluid will be in counter-current flow to the flow in the tubes toward the tube-side entrance; and in co-current flow toward the tube-side exit. Relatedly, the fluid on the shell side may enter at two locations with the shell-side fluid flowing counter-current to the tube-side fluid: one near the middle of the heat exchanger; and one near the tube-side flow exit. The coolant in the heat exchanger can be air, water, glycol, oil, any of a number of engineered coolants or mixtures thereof.

For a fuller understanding of the nature and advantages of the present invention, reference should be had to the ensuing detailed description taken in conjunction with the accompanying drawings.

BRIEF DESCRIPTION OF THE DRAWINGS

FIGS. 1A and B provide assembly illustrations of a gas production module according to embodiments of the present invention.

DETAILED DESCRIPTION OF THE INVENTION

Figure 2:
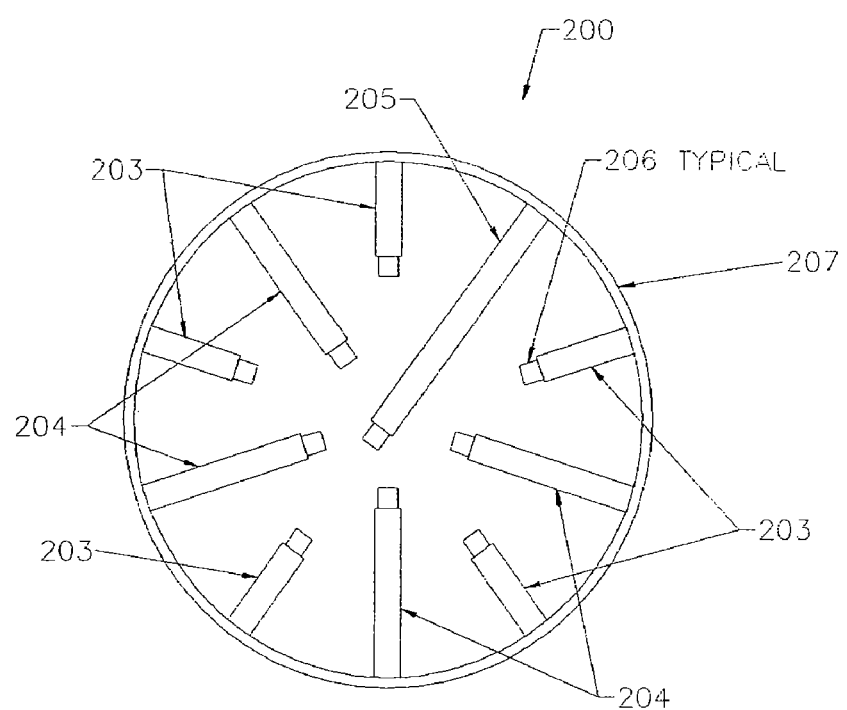
FIG. 2 provides a cross-section view of a downdraft gasifier showing the arrangement of a plurality of air injection nozzles according to embodiments of the present invention.

Many downdraft gasifiers consist of different zones, or strata, of materials at different states of temperature, pressure, and material composition and flow. In some cases, the uppermost zones of a downdraft gasifier can include fresh feed that was recently added to the gasifier. The next zone can include a drying zone where primary combustion-air dries the feed as the feed is heated by the next lower zone, where the primary combustion air burns the smoke or tar vapors formed by the pyrolyzing hot feed. This can be referred to as the pyrolysis zone. Below the flaming pyrolysis zone is the char oxidation zone, where steam and carbon dioxide oxidize the hot char, until these endothermic chemical reactions lower the temperature of the char below a certain point. An oxidant can be added to the char oxidation zone to increase the temperature and keep the steam and carbon dioxide active in the oxidizing char.

Depending upon how the variable parameters in the strata are controlled, the results can be dramatically different. For example, a small downdraft gasifier that is manually operated may lack positive, closed-loop control of gasification-zone temperatures, fuel conversion rates, gas residence time, pressure differential, bed porosity and the flow of hot gaseous combustion products through the gasifier. As a result the manual process may be unable to produce a consistently high quality, low tar raw gas. The lack of automatic sensing and control of process variables results in uneven gasification rates, variable gas quality, high tar levels, inconsistent levels of bed porosities, a high propensity for channeling dirty gas, ash clinkers, excessively localized hot spots, high tar levels when "rat holes" occur, or ultimately in system shutdown when out of control conditions warrant. In downdraft gasifiers without effective means to control the amount, location, and duration of air or oxygen injection as may be required by the various strata, and without the means to monitor and control bed porosity, bed uniformity and flame front position, there is often minimal ability to control gasification rates, gas quality, or tar levels. The result of manual control can be sections of the strata that become too hot, too cold, too porous, or too densely packed.

Fouling of heat exchangers can result in a loss in their ability to cool the hot process stream to a temperature suitable for conventional filtering. Manual cleaning of heat exchangers is a time-consuming dirty job, although there are rotating brushes on long rods or cables made for this purpose. Self-cleaning heat exchangers have been reported for use with liquids in which 1.5-mm to 3-mm diameter particles are deliberately added to the liquid, which scour the heat transfer surface. After passing through the heat exchanger, the solids are removed from the liquid and returned to the entrance of the heat exchanger in a closed loop for the solids.

In spite of substantial work in the field of downdraft gasification, there are very few commercial systems in the world. Moreover, none exhibit the degree of automation useful for unattended operation via control by a computer network. This lack of automation is brought on by shortcomings in the design of the apparatus and its methods of operation. Such shortcomings increase the customer/user operation and maintenance labor content to the point where system operation is seen as burdensome or too expensive. The majority of small, downdraft gasifiers that have been sold commercially are located in countries where there is there is an abundance of low cost labor, and intense downward pressure on capital costs. The combination of these two factors results in apparatus with minimal automation that is very labor intensive to operate and maintain, and which relies on archaic gas cleanup technologies that yield toxic waste streams such as tar laden water. Downdraft gasification involves a number of interrelated processes that can be controlled simultaneously for maximum biomass conversion efficiency, process stability, and fuel gas cleanliness. However, many of the interrelated processes are so complex that often only a highly trained, continually aware, and continually focused expert is capable of tracking all of the parameters, and making the required process modifications on a timely or consistent basis to maintain the low tar levels without excessive temperatures or other parameters that can damage the gasifier system.

Thus, even in countries with a large pool of low cost labor, minimal automation is a barrier to large-scale commercialization, because it often limits the operational, economic, and environmental effectiveness of the system. Manual operation virtually eliminates the ability to achieve real-time control of critical interrelated parameters such as temperatures, differential pressures, feedstock addition rates, feedstock size, feedstock moisture, char conversion rates, bed porosity, char/ash removal, gas quality (tar, particulate and water vapor levels and energy content), and propensity for channeling and bridging. In turn, these poorly controlled parameters can lead to high tars, condensation of water in the gas, poor/variable gas quality, low system efficiency, short run duration due to bridging, bed packing, and bed channeling, increased maintenance, hazardous waste streams, high emissions, and the increased potential for unsafe conditions. But even if the processes are automated, there is no guarantee that the gasification system will operate in a stable, efficient, effective manner. Unless the control algorithms have been developed based upon a complete understanding of the underlying variables, the process may not fulfill its objectives.

Automation combined with effective algorithms is but one goal for successful operation of a downdraft gasification system. An apparatus embodiment of the invention is capable of maximizing the capability of automation by using multiple secondary air-injection nozzles. Some have suggested a plurality of nozzles may be undesirable due to the generation of multiple hot spots and cold spots and the formation of ash slag and clinkers. Embodiments of the present invention can avoid these drawbacks by using a large number of char-air injection tubes and multiple nozzles on each tube that introduce secondary char-air in a widely dispersed manner, location, and in the prescribed ratios compared to primary air to produce a thermal management system that results in a char bed that is ideal for the destruction of tars.

Some current gasification approaches reduce the opportunity for numerous cost and performance improvements such as automated methods to accommodate a wide variety of biomass feedstocks and to accommodate size, moisture, and energy density variability within each feedstock without the need to make physical changes to the apparatus. These approaches also reduce the opportunity for system efficiency increases that reduce the amount and cost of biomass fuel consumed, gas quality improvements that permit the fuel gas to be used safely in existing internal combustion engines, and emerging gas-based power generating devices such as fuel cells, Stirling engines, thermo-photovoltaics, micro-turbines, small gas turbines, and thermoelectric generators. Further, these approaches reduce the opportunity for one-button start/stop automated operational cycles that allow systems to be operated by minimally trained operators or to be operated in an unattended manner, automated failure mode responses including emergency shutdown upon detection of unsafe operating conditions, and discrete, integrated modules that can be rearranged with ease to pursue electric, electric and thermal, or only thermal markets. Moreover, these approaches provide little opportunity for discrete, integrated, standard modules that exploit the potential for mass production, and design improvements that allow for rapid maintenance with minimal labor.

Some current approaches for gasification often do not provide effective gas cooling, which can lead to unclean fuel gas. The cooling of the hot producer gas is a difficult heat transfer problem from a practical point of view. Unequal temperatures and the resulting thermal expansion and contraction of different parts of a tube-and-shell heat exchanger often require provisions for stress relief, when operating with large temperature differences between the two fluid flows. Some current techniques involve permanently attaching the tubes to the two tube sheets, fixing one tube sheet, and allowing the other tube sheet to move within the heat exchanger to relieve the stresses. An O-ring seal is commonly used between the sliding tube sheet and the stationary shell. However, if one or more of the tubes becomes plugged, the plugged tube or tubes can rapidly approach the temperature of the fluid on the shell side, which can cause the plugged tube to expand and contract differently than the other tubes still having flow. This differential growth creates severe stresses at the tube sheet and tube interface, which can cause welds to fail at that location.

Current techniques often involve water scrubbing to remove residual tars and chars from producer gases. Unfortunately, these materials are very fine aerosols and particles, which can be difficult to remove by this method. More over, for efficient scrubbing the water used for scrubbing is also in the form of a mist. The use of water scrubbing creates a waste-water disposal problem. Coalescing filters are often used to remove these fine materials by Brownian motion, but with a significant, undesirable pressure drop added to the system. If the tars do not have flow properties, the coalescing filters must be periodically serviced to remove tars or the filters must be replaced.

Embodiments of the present invention include an innovative design of the gasifier, gas cooling and cleanup systems, and automated control of these subsystems. An open-top downdraft gasifier incorporates a unique multi-layer secondary oxidant (air) injection system, temperature sensing at each layer, and microprocessor-based control algorithms that constantly adjust gasifier temperatures and other operating conditions to achieve consistently high gas quality, and ultra-low tar levels over a wide range of gas flow rates. Gasifier design embodiments dramatically expand the usable range of gas flow rates, i.e., the "sweet spot" of conventional gasifiers. This expanded "sweet spot" permits production of high quality, ultra-low tar gas over an extended power range and the ability to use a much broader range of feedstock types, sizes, configuration, mixtures and moisture content than ever before possible.

Embodiments also provide a gasification system configured for positive control of material flow through the gasifier and the porosity of the gasifier bed (pressure differential). These control parameters are the result of a novel reciprocating grate mechanism coupled with digital sensing of the gasifier pressure differential linked to the gasifier system's imbedded micro-processor control system. Some embodiments of the present invention cool the producer gases prior to removal of entrained solid char and ash particles, rather than removing them in a cyclone separator, prior to cooling as in the prior art. The entrained char particles have a large surface area, upon which the residual tars tend to condense, rather than on the much smaller surface of the heat exchanger. In addition, the entrained particles are proven to scour the heat exchange surface to keep fouling to a minimum. Embodiments of the present invention also include a shell-and-tube heat exchanger to allow all tubes to expand and contract independently of each other, as well as, the use of two flows of cooling air to achieve higher flow rates of cooling air with lower blower energy requirements.

In some embodiments, the renewable fuel gas produced is clean enough to be consumed in a variety of electrical, thermal, and chemical devices that were designed to operate using fossil fuels, both gaseous and liquid. Additionally, modular, portable, distributed biomass gasifier embodiments meets the degree of automation required for unattended operation via control by a computer network.

Gasifier systems and method embodiments of the present invention provide secondary air-injection systems having multi-level locations, and optimally arranged and easily adjustable air-injection nozzles. The length and air-injection points in each air-injection tube, as well as the number of air-injection nozzles, can be easily changed, for example by exchanging an air-injection tube for a different air-injection tube. The number of axial locations of secondary air injection can be varied, and the amount of secondary air at each level can be precisely adjusted. Uniform or non-uniform distribution of air is achieved through placement of air-injection nozzles. Embodiments provide for extremely high levels of carbon conversion (e.g. >98%) through the use of a controllable gate and a secondary air injection system. Desired temperature ranges can be controlled and maintained over a prescribed distance to crack tars and to convert char and $H_2O$ to $H_2$ and CO, and char and $CO_2$ to CO. Components can be protected by managing temperature and preventing temperature excursions. Gasifier temperatures can be managed to reduce the potential for formation of large fused ash particles, especially with high ash/silica feedstock. Embodiments provide an automatic ash removal and management system. Fused ash on the grate of the gasifier can easily be broken up, and desired pressure differentials in the gasifier can be controlled and maintained. Ash and fused ash can be removed from the bottom of the bed independently of settling the bed. Embodiments provide for the ability to operate the grate without being affected by forces across the grate due to air pressure plus the weight of the bed. Embodiments include grate designs that facilitate maximum tar conversion in the gasifier, simple cleaning, maintenance and repair, and that permit the use of low cost, light weight materials. Gasifier temperatures can be controlled so as to eliminate the need for heavy, difficult to fabricate, high maintenance, and costly refractory materials. At shut down, the gasifier can be automatically isolated, and air flow stopped to preserve the char bed for future operation. Relatedly, an open top of the gasifier can be automatically closed at shut down using potential and kinetic energy, even in the event of an electrical power failure. Embodiments provide for the automatic control of feedstock and char flow, the maintenance of consistent density of the char bed, and the elimination of channeling in the char bed. An imbedded igniter can allow for on-command and remote start up of gasifier. In some embodiments, gases can be cooled prior to particulate removal. Embodiments also provide a tube-and-shell heat exchanger with each tube allowed to expand and contract independently of the other tubes.

Feedstock Flexibility

Embodiments of the present invention include gasifiers that can be operated with wood chips made from soft wood, as well as, hardwood species. A non-limiting list of suitable feedstocks includes extruded grape pumice, almond shells, pecan shells, coconut shells, grass pellets, hay pellets, wood pellets, shredded cardboard, shredded plastic coated paper, mixtures of shredded paper and plastics, mixtures of relatively homogenized paper and plastic formed into pellets or other shapes, mixtures of shredded wood, leather, rubber, and cloth. These feed materials often have particle shapes and sizes that will form a bed with sufficient porosity for the passage of gases with only a moderate pressure drop. Non-limiting examples of suitable particle sizes and shapes include pellets, wood chips, pecan shells, almond shells, crushed coconut shells, etc. Suitable particles may or may not include powders and stick-like shapes.

Feed Preparation

The feed preparation typically includes screening to remove oversized pieces of feed that could easily bridge in the gasifier or jam the feeding system, as well as, undersized material that can tend to form a high pressure drop across the bed and also tend to include undesirable dirt and small rocks. The feed is then dried using waste heat recovered from the hot gases and char made in the gasifier.

Feeding

The movement of feed through the system can be automated. In a non-limiting embodiment, a series of three level sensors mounted on the dryer bin, the feeder bin, and the gasifier are used to direct the movement of feed from a storage bin, through a sorter, into the dryer bin, through the dryer into a surge bin, and through a feeder into the gasifier. When the gasifier needs more feed, a conveying device moves dried feed from the surge bin. When the fuel level in the surge bin is low, the drying conveyer is activated to refill the surge bin. When the drying bin is low, the storage bin feeds fresh material into the sorter, where the proper size of feed is conveyed to the drying bin. In one non-limiting embodiment, the sorter and the conveyer to the dryer are continuously running.

Gasifier

When gasifier embodiments make fuel gas using air as the oxidant, the top of the gasifier can be open to the atmosphere to allow the biomass feed to freely drop into the gasifier. This open top also permits the primary combustion air to enter the gasifier. When making fuel gas in this manner, the gasifier system can be operated at pressures a little below atmospheric. If this gasifier were used to make synthesis gas using oxygen, the feed could drop through a rotary valve or lock-hopper into the gasifier preventing air from entering; part of the oxygen or oxygen-enriched air could be added through a port or ports near the top of the gasifier, and the gasifier system could be operated at pressures above atmospheric.

In some gasifier embodiments, the remainder of the combustion air, oxygen-enriched air, or oxygen used in gasification is injected into the char bed at multiple levels at multiple locations through multiple nozzles in each of several injection tubes within each level. One non-limiting embodiment uses horizontal, radial injection tubes at a multiple of levels and angular locations. If oxygen is used, it may be diluted with water vapor or carbon dioxide to avoid excessive temperatures.

Turning now to the drawings, FIGS. 1A and 1B show a gasifier apparatus 50 according to one embodiment of the present invention. The gasifier apparatus includes gasifier body 101, which may be cylindrical in nature. Gasifier body 101 may not include a conical gasifier shape in the active part of the gasifier. Others have described the use of conical shapes in the active part of the gasifier, which typically concentrate the producer gases into a smaller cross-sectional area for more effective air injection with a single level of air injection. However, such conical sections can increase the pressure drop through the gasifier bed, which may decrease the efficiency of the engine or require more energy to draw the gases through the gasifier system. The feed enters through the open top 100 of the gasifier along with primary air. The product gas leaves the gasifier through flange 112 located at the bottom of the gasifier.

As shown in FIGS. 1A and 1B, a gasifier can include horizontal, radial tubes 102 that penetrate the cylindrical wall of the gasifier body 101 to inject secondary air into the char bed. There may be multiple (e.g. five) levels of these air injection tubes. The injection tubes are attached to the outside of the hot gasifier wall 101 with sanitary fittings or flanges through long stand-off tubes 102 to allow the use of elastomeric gaskets and easy removal of the char-air injection tubes for inspection and maintenance. Consequently, the number and location of these nozzles is easily changed, as is their replacement when required. One non-limiting embodiment uses silicone-rubber gaskets to seal the char-air injection tubes to the gasifier. The gasifier may be opened at a flange 105 for maintenance.

In a non-limiting example, FIG. 2 shows a portion of a gasifier apparatus 200 that includes short injection tubes 203 alternating with long injection tubes 204 for a total of ten tubes for each of five levels in the gasifier for a total of 50 such tubes. Embodiments encompass gasifiers having any suitable number of tubes and levels. The short tubes may also alternate with long tubes in the vertical direction. As shown here, one of the ten tubes in each level 205 may be longer than the rest in order to cover the central area of each level, with short tubes 203 on each side. In one non-limiting embodiment, the gasifier is 20 inches in diameter, with 6 inches between the axial levels.

In some embodiments, this pattern is repeated at each of five levels, but offset by multiples of 36° from one level to the next, so that short tubes alternate with longer ones vertically and the extra-long tubes are more evenly distributed. The angular location of the extra long tube is different for each adjacent level. The nozzles are spaced on the injection tubes, so as to have a relatively even distribution of air at each level. There are five levels of char air injection, with ten angular locations of horizontal char-air injection tubes. There are sixteen nozzles in each extra-long tube 205, ten nozzles in each long tube 204, and four nozzles in each short tube 203, for a total of 380 nozzles. Tubes pass through reactor chamber wall 207. The axes of the nozzles are 45° from vertical, so as to impart a generally downward flow of air at 45° to the generally axial direction of the producer gases. In one non-limiting embodiment, drilling ⅛-inch-diameter holes perpendicular to the axes of the char-air injection tubes formed the nozzles. Quantities and location of the injection tubes and nozzles are non-limiting.

In one non-limiting embodiment, the pressure drop that is caused by the flow of producer gas through the gasifier provides the pressure differential to blow air into the char bed through each air-injection tube. The relative flow of air can be controlled with valves to each level or to each char-air injection tube. In another non-limiting embodiment, the air to be injected into the char bed (char-air) passes from a manifold common to all levels, then through a tube and valve to a toroidal shaped secondary manifold that supplies char-air to all of the air-injection tubes on one of the several levels. The negative pressure in the gasifier induces the flow of air into the secondary-air-injection nozzles. In one non-limiting preferred embodiment, a mechanical blower supplies the char air to the char-air injection tubes. The computer controls a variable valve on each level of char-air injection tubes in the gasifier. In another non-limiting embodiment, a valve controls the flow of air to each char-air injection tube from a manifold slightly pressurized with a single blower to achieve the desired temperature control. In another non-limiting variation of this preferred embodiment, each of the five levels of char-air injection tubes is equipped with its own blower and each blower's speed is controlled by the computer.

One advantage of the char-air injection tubes penetrating the outside shell is the ability to have different flow rates of oxidant going to the different levels, as well as, to the different individual char-air injection tubes. This allows for an unprecedented level of temperature control of the char bed. An additional advantage of this design over a central axial manifold in the gasifier is that the relative openness of space between the char-air injection tubes minimizes the potential for bridging and channeling of the feed and char to occur. Another advantage of the use of char-air injection tubes penetrating the outside shell of the gasifier in this manner is the ability to operate very large diameter gasifiers by injecting combustion air deep in the char bed to eliminate cold spots while maintaining uniformly high bed temperatures for the destruction of tars and for the endothermic conversion of carbon dioxide, water vapor, and char to combustible gases (hydrogen and carbon monoxide). One embodiment of a larger diameter gasifier could add at least one additional longer length of char-air injection tubes, to be able to uniformly distribute the char air through the larger diameter bed.

A gasifier can be started with a bed of charcoal left over from the previous operation. A flow of air is induced through the gasifier with a mechanical device, e.g. a blower, an internal-combustion engine, or an aerodynamic device, e.g. an air-motivated eductor. In a non-limiting embodiment, an electrically heated cal-rod is permanently mounted in the lower portion of the char bed, which is used to ignite the char bed. Thus, the gasifier may be started automatically, even remotely. The cal-rod is automatically shut off after gasifier ignition to avoid damage due to overheating.

In some current systems, which ignite the top of the char bed in the gasifier, the upper level of char becomes excessively hot, because it is always in contact with fresh air, while the lower char bed is merely being warmed up by hot combustion gases. One advantage of lighting the bottom of the char bed is that excessively high temperatures are avoided during ignition, because oxygen in the air is consumed by char, which is just igniting and not very hot. The temperatures in the char bed may be adjusted immediately after ignition by adding secondary air at the various levels through the air-injection tubes.

In other embodiments, one of the char-air injection tubes (203, 204, or 205 in FIG. 2) may be removed, and a hand-held propane torch, cal-rod, or other source of heat can be used to ignite the char bed, and then the char-air injection tube reinserted. In another embodiment, a gas burner is mounted permanently in the igniter location and provided with gas by electronically opening a gas valve, which is electronically ignited. After char ignition is attained, the burner is turned off. In another embodiment, a flammable gas is fed into the injector subsystem and ignited to promote ignition of the bed.

In some embodiments, a temperature measuring device, e.g. a thermocouple or other device, may be inserted into a short thermowell located at the closed end 206 in FIG. 2 of any or all of the char-air injection tubes. The amount of air injected into each level is independently controlled, based on temperature measurements of each level. To provide continued gasifier control in the event a thermocouple fails, two or more thermocouples may be used in each level to control the air flow to that level. For example, an air blower (or a controllable valve connected to a common manifold pressurized with one blower) may be provided for each level to deliver varying amounts of char-air to each level. Gasifiers manufactured according to embodiments of the present invention have been successfully operated with wood chips having moisture contents between 1% and 25%, and for periods of half an hour with wood having as much as 33% moisture (wet basis). The existence of channels and bridging in the fresh feed near the top of the gasifier and in the bed of char can be discouraged by periodically automated vibrating of the gasifier to fluidize the fresh feed and char particles. This fluidization collapses the channels and bridges in the feed and char beds. The gasifier and heat exchanger can be spring mounted to allow a minimum of vibration energy to shake them vigorously and to avoid inducing stresses into the hot mechanical components that could damage them.

Figures 3A, 3B:
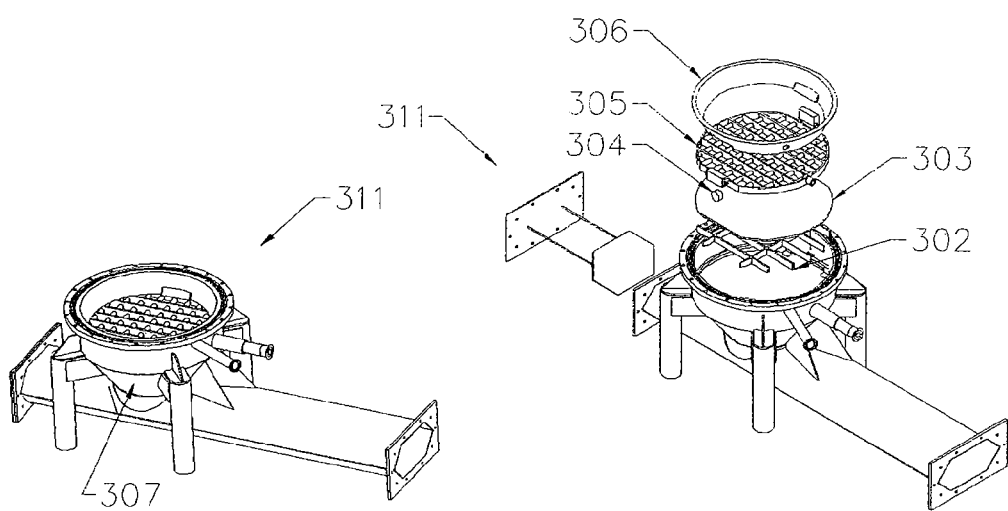
FIGS. 3A and B illustrate a lower portion of a gasifier, including a grate and gas outlet channel, according to embodiments of the present invention.

As shown in FIGS. 3A and 3B, gasifier embodiments can include a lower portion of a gasifier 311 having a wire-mesh grate 303 located at the bottom of the gasifier below the lowest level of air-injection nozzles. The grate supports the char bed and has an aperture size smaller than the average char particle. The location of the grate is selected to allow the hot producer gases to be partially cooled by the endothermic reactions of steam and carbon dioxide with the char. In one non-limiting embodiment of the grate, the wire mesh has ¼ openings and is made of Type 304 Stainless Steel (T304). To support grate 303, the weight of the char and fresh feed, and the forces generated by the pressure drop across the gasifier and grate, an open structure 302 is provided. The gasifier system may include a deflector plate 306, just above the grate to allow for the packaging of the grate mechanism below it in the cylindrical gasifier, but this area is free from air injection. In one non-limiting embodiment, a gasifier has a conical bottom 307 to aid in entraining the char, ash, dirt, and pebbles out of the gasifier, after the material passes through the grate. A gasifier may also include thick layers of insulation (not shown) surrounding the outside of the cylindrical sides and bottom of the gasifier.

Some embodiments may include a horizontally reciprocating mechanism 305 immediately above the grate that moves the char particles against the wire-mesh grate 303 and each other, until they are ground or broken up small enough to pass through the wire-mesh grate 303 with the gases. This reciprocating mechanism has a short cycle of travel and is supported by two thin rollers 304 or low friction slide blocks. In one non-limiting embodiment, the rollers or slide blocks are made of ceramic materials. The mechanism covers the grate, but has large apertures through which the char and ash, as well as, clinkers, rocks, and tramp metal pass to the grate. This grate mechanism will grind up small rocks commonly found in biomass feedstocks, as well as sintered or fused clinkers that tend to form in the hotter, lower section of the gasifier. In the event that the reciprocating mechanism becomes jammed, a spring-loaded shock absorber in the connecting drive-rod prevents damage to the mechanism. The hot gases entrain the small char, ash, and rock fragments out of the gasifier and into the gas cleanup equipment at high velocities.

This reciprocating mechanism is very good at removing char and ash, and in some embodiments it may operate only intermittently. Thus, a gasifier may produce char in primarily in intermittent pulses, whenever the grate mechanism is activated. Vibrating the gasifier also releases char fines from the char bed that pass through the grate. The interval between activating the grate and the duration of the grate action can be used to control the pressure differential through the gasifier and the grate, allowing long operating times between maintenance to remove tramp materials from the grate, such as iron or stainless steel objects which resist the grinding action of the reciprocating mechanism above the grate. This innovative feature of the grate system allows the use of feedstock containing some contamination from dirt, rocks, etc., without the need for frequently shutting down the gasifier to remove them. Currently used gasifier designs often cannot automatically remove tramp materials to this extent, and thus cannot be operated continuously over an extended period, except with very clean feedstocks, which are not typical. In one non-limiting embodiment, reciprocating mechanism 305 may include square openings about 1¾" on a side that are about 1½" deep, with walls about ¼" thick.

In some embodiments, while the gasifier is being shut down, the feeder is shut off and the flame front is encouraged to rise toward the fresh feed by reducing the char-air, which causes more air to be drawn in through the top of the gasifier. Referring to FIG. 1A, after the last feed is converted to char, the gravity driven feed gate 103 is automatically released magnetically, rolls on its wheels down a short ramp 104, and slides over the top of the gasifier 100. The feed gate makes a sufficient seal to effectively isolate the char bed from atmospheric air. In the absence of fresh air, the char slowly cools. This leaves char in the gasifier, which remains in place and is used to start the gasifier for the next period of operation. If the gasifier is not allowed to cool below the auto-ignition temperature of the char, opening the feed gate and starting the flow of air to the gasifier may result in an auto-ignition of the char. Thus enabling intermittent or semi-continuous operation to produce gas and char.

Gas Cooling

In some embodiments, after the hot producer gases and entrained char leave the gasifier at about 700° C. to 800° C., they immediately pass into the tube side of a novel shell-and-tube heat exchanger. Ambient air is blown into the shell side to indirectly cool the producer gases. These entering process gas temperatures are considerably higher than the temperatures, for which some commercially available heat exchangers are rated and available.

Given the high gas temperatures, to which the heat-exchanger tubes are exposed in the hot end of the heat exchanger, the heated tubes are often allowed to thermally expand freely to avoid being warped or broken. If one of the tubes becomes badly fouled or plugged with tar or char, it can become colder, and attempt to contract relative to the other tubes still carrying their full share of the hot gas and entrained char. The design of heat exchanger embodiments of the present invention allow each of the tubes to expand or contract independently of the others, thereby relieving the thermally induced stresses in each tube. The tubes can be all welded to a common tube sheet at the hot end. The inside diameter of the tubes can be sized to allow the largest expected char particle to pass through the tube without danger of plugging it.

Figure 4:
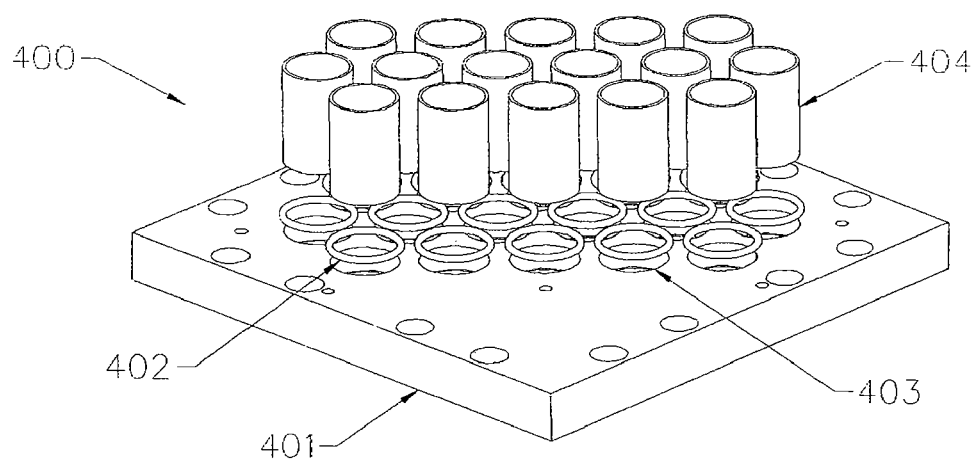
FIG. 4 shows a heat exchanger having heat exchanger tubes penetrating a fixed tube sheet with seals to provide for motion of the tubes due to differential thermal expansion, according to embodiments of the present invention.

In some known systems, the design of the cold end includes welding all of the tubes to the cold end tube sheet and allowing the tubes to expand and contract as a unit. When all tubes were equally constrained, however, broken welds, tubes, or tube sheets may result, when one or more of the tubes became plugged. In heat exchanger embodiments of the present invention, the cold end of each tube can be allowed to freely and independently expand and contract, while moving back and forth through individual seals in the cold-end tube sheet. In a non-limiting embodiment, FIG. 4 shows a heat-exchanger tube sheet 400 that includes O-ring seals 402, which are placed in the cold-end tube sheet 401 in O-ring grooves 403. In a non-limiting embodiment, short copper tubes or sleeves 404 are located downstream of the O-ring grooves 403 and are thermally shrink-fit into place. The heat-exchanger tubes pass through the O-rings 402 and the copper tubes 404, with the O-rings 402 making seals between the tubes and the cold-end tube sheet 401. The copper sleeves support the tubes and keep them centered in the O-ring seals to control the amount of O-ring deformation. The O-ring seals and copper tubes are lubricated with grease during assembly. This grease also serves as a barrier to keep abrasive char and ash particles from reaching the O-ring seals. The temperatures at the cold end are maintained low enough to allow the use of elastomeric rubber O-rings. Non-limiting examples of the O-ring materials are silicon rubber, neoprene, Buna-N, or the material Viton to survive modest temperature excursions that could occur if the cooling blower temporarily malfunctions.

Adjusting the flow rate of cooling air to the shell side of the heat exchanger can control the outlet temperature of the producer gas. In one non-limiting embodiment, the flow rate of air is controlled by a variable speed of the blower that supplies the cooling air to the heat exchanger. In another embodiment, the cooling air is supplied by a fixed-speed blower with the flow rate of cooling air is controlled by a controllable damper or dampers. In one embodiment, the cooling air-flow enters the heat exchanger at the cold end and travels generally counter-currently to the producer gas stream. Baffles in the shell side can cause the cooling air to make many passes back and forth across the heat exchanger tubes.

In another embodiment, the cooling air is split with part of it entering the cold end of the heat exchanger and leaving the middle of the shell of the heat exchanger. The other part of the cooling air enters the middle of the heat exchanger and exits the hot end of the heat-exchanger shell. Baffles in both streams of cooling air cause it to pass back and forth across the heat-exchanger tubes in a generally counter-current fashion to the producer gases. A given gas blower often can produce a greater flow of air at a lower pressure. An advantage of this embodiment is the greatly lowered pressure drop across the two halves of the shell, which allows the cooling-air blower to produce much more cooling air with lower power requirements. This greater air-flow also eliminates the need for a separate tempering-air blower to avoid excessively high exiting air temperatures. In still another embodiment, the cooling air enters near the middle of the heat exchanger and part of the cooling air travels to the hot end in counter-current flow and the other part travels to the cold end in co-current flow. This arrangement also allows a greater throughput of cooling air with a given blower and produces a medium temperature air suitable for drying feedstock.

In some embodiments, an electrically heated duct heater may be located in the cooling-air inlet duct, which preheats the heat exchanger to above temperature of the dew point of producer gases prior to ignition of the char bed in the gasifier. After the heated air passes through the heat exchanger, it is temporarily ducted to the filter enclosure to aid in preheating the filter housing. In addition, before ignition, air is drawn through the gasifier and heat exchanger to preheat it before it enters the filter enclosure to heat it. These precautions can prevent condensation of water on the filter media during startup. After startup, the duct heater is turned off.

In another non-limiting embodiment of the heat exchanger, the cooling fluid is water or glycol/water solutions. The individual tubes are allowed to freely expand with temperature through the same type of seal in the cold tube-sheet as with the air cooled heat exchanger. The water-cooled heat exchanger is also preheated prior to ignition of the gasifier, to prevent water condensing from the producer gas. Some known systems require the removal of entrained char particles in cyclone separators prior to their cooling. In some embodiments of the present invention, there is no attempt to remove the entrained char and ash particles prior to cooling. The large surface area of the small particles of entrained char and ash can serve as condensation nuclei for the small amount of residual tar vapors condensing in the cooling gas. In some exemplary embodiments, the entrained char particles adsorb residual tars on their surfaces, as they cool while passing through the heat exchanger.

The larger char and ash particles can also have a scouring action to keep the heat-transfer surfaces clean of tar, fine char, and ash deposits, while they are entrained by the turbulent flow of the producer gases. In currently known approaches that include removing the larger char particles prior to the heat exchanger with cyclone separators, the heat-exchanger tubes often need to be cleaned much more frequently, compared to present embodiments described here. In some embodiments, the heated air or fluid from the heat exchanger can be used to dry the biomass or organic feedstocks or for other low-temperature heating applications.

Gas Filtering

In some present gasifier embodiments, producer gas is made with low tar content. Char, with its small amount of adsorbed tars, can have a dry, non-sticky appearance. Such results allow for the filtering of cooled gases to remove the entrained char, resulting in a clean producer gas that is suitable for fueling internal combustion engines without fear of tar deposits in the engine. The char fines can be filtered out of the gas stream, using a permeable filter. Suitable filters for use with embodiments of the present invention include those described in co-pending U.S. patent application Ser. No. 11/427,221, filed Jun. 28, 2006 (Method and Apparatus for a Self-Cleaning Fluid Filter; the contents of which are incorporated herein by reference for all purposes.

Gas Usage

Conventional internal combustion engines, other prime movers such as turbines, fuel cells, Stirling engines, or scroll expanders may use the producer gas as fuel. If a blower is included or eductor is provided, the gas may be simultaneously burned in an engine and in gas burners or a flare. Two or more gasifiers could be plumbed together in parallel to efficiently operate several prime movers or burners in parallel over a very wide range of power outputs. This would allow the several small systems to respond as a very versatile large system, without the expense and risk of developing such a large system. The engine can be operated in parallel with a blower that is providing fuel gas for a burner application, thus providing heat and power simultaneously without necessarily recovering of waste heat from the engine. With this arrangement, the engine and the burner can be operated independently of each other. For system startup, it is possible to start the gasifier using a mechanical blower or air-motivated eductor to provide the draft through the gasifier system. The first gas produced from the char is low in fuel value and is sent to a flare. In one non-limiting embodiment, a glowing electrically heated element is located (e.g. permanently) on the flare to automatically ignite the producer gases as soon as they are combustible. After the gasifier is ignited and feeding has commenced, the engine may be easily started on the producer gas.

In one non-limiting embodiment, the engine can be used to start the system using a conventional fuel initially and then transitioned automatically by the system controls from pulling pure air through the gasifier system to the engine prior to ignition, to pulling non-combustible oxygen-depleted air during gasifier ignition, to pulling combustible producer gas during steady-state operation. This clean fuel gas could be used as a feedstock for conversion to ammonia, alcohols, or Fischer-Tropsch liquid fuels and chemicals. In some embodiments, the gas produced could be even more suitable for conversion to alcohols or Fischer-Tropsch liquids, if it were made using oxygen, rather than air (i.e., as a syngas with little or no nitrogen content).

Automated Controls

In some embodiments, the entire system is controlled by an embedded, programmable automation controller (PAC), which in turn is controlled by a remotely located computer, using a local area network (LAN) or the Internet for communication. Embedded in the control program are "expert" algorithms that cause the system to properly react to changing process conditions in the same or similar manner as an expert human-operator would. Such changing process conditions include varying feed moisture, engine loads, pressure drops through the gasifier, etc. This allows the system to be operated and monitored by a part-time operator, whose main chore is to reload the feed storage bin periodically. In the event of a serious malfunction of the system or by a simple command from the operator, the computer will shut down the system in a safe manner.

In many known systems, the temperatures in a downdraft gasifier are highest in the region of flaming pyrolysis and decrease as the product gases react endothermically with the char bed. Some known systems use only one or two levels of char-air injection to raise the temperature of the char bed. This can result in very short hot zones near the point of char-air injection. In some embodiments of the present invention, extensive char-air control provides for a unique ability to maintain the temperature of the entire height of the char bed at temperatures high enough for the rapid destruction of residual tars and the conversion of water vapor, carbon dioxide, and char to carbon monoxide and hydrogen, but at temperatures low enough that inexpensive stainless steels can be used in the construction of the gasifier, rather than exotic metals or heavy ceramics. This results in a lightweight gasifier that can be rapidly brought up to temperature and produce clean, usable gas. By manipulating the relative amounts of air entering the top of the gasifier and air injected into the char bed, the location of the flaming pyrolysis zone can be controlled and compensate for widely varying amounts of moisture in the feed.

In some embodiments, limits can be set to prevent temperatures that are too high and which might damage the gasifier, as well as, temperatures so low that tars would pass through the gasifier without destruction. The computer can keep the higher temperatures in the lower portion of the gasifier automatically. When the local temperatures are extraordinarily high in the gasifier, it is often due to a channel or "rat-hole". Vibrating the gasifier more often will tend to collapse the rat-holes, leading to a much lower temperature in the upper gasifier. Vibrating the gasifier more will also pack the bed and increase its pressure drop. The control system will attempt to compensate for the higher dP by grinding up the char and moving more char fines through the grate which leads to a lowering of the flame front as the char bed inventory is reduced. So, the system automatically performs this extra gasifier vibration, if it detects extraordinarily high temperatures, but only for a limited number of times to avoid excessive vibration that would pack the bed or remove too much char. Another source of high dP across the grate is an accumulation of rocks or clinkers (sintered or fused ash) on the grate, which will cause the grate dP to rise. Both of these situations can be remedied by the automated control system by activating the grate mechanism for longer durations and/or more often at shorter intervals.

The engine can be the prime mover for the producer gas through the system, while generating electricity after the initial preheat stage during startup. The air/fuel ratio can be controlled while the engine is running through the use of a wideband $O_2$ sensor and a single combustion air butterfly valve. Controlling the $O_2$ level in the exhaust gas can help to be in compliance with strict emission standards for generator systems and contribute to greater engine efficiency by making a more powerful fuel mixture. This combustion air valve can be microprocessor controlled and rely on mass-air-flow sensors mounted in the gas stream as well as the air stream to match a stoichiometric mixture through any reasonable power range. This mixture control can be tuned within the software by adjusting a variable, if further emission reductions are necessary.

Maintenance

Periodically the gasifier may be serviced to remove tramp materials from the grate, such as nails, nuts, washers, screws, or bolts made of iron or stainless steel. In some embodiments, the gasifier is first cooled and purged to safely remove residual producer gases containing carbon monoxide. The remaining char bed can then be safely removed from the gasifier. If the grate needs additional cleaning, the bolts on the gasifier flange can be removed. FIGS. 1A and 1B show that, in one non-limiting embodiment, the upper portion of the gasifier 109 then can be lifted off the lower portion 111 with the use of hydraulic cylinders 106 mounted (e.g. permanently) in the frame (107 and 108) with a hydraulic pump and suitable valving. In some embodiments, all of the four hydraulic cylinders 106 are inter-connected with hydraulic hoses, so that all four hydraulic cylinders lift simultaneously. From one location, the operator lifts the upper part of the gasifier 109 from the lower part of the gasifier 111 using a hydraulic valve to deliver pressurized hydraulic fluid to power the hydraulic cylinders. Alternatively, the mechanism could be powered by interconnected jackscrews or ratchets. The four corner posts of the gasifier support structure consist of telescoping tubing, so that the structure holding the gasifier is very stable. The use of pins inserted for safety after the unit is lifted ensure that the gasifier can not fall on the operator accidentally, as it might happen with accidentally released hydraulic fluid pressure or a leaky hydraulic system.

To inspect and clean the inside of the heat exchanger tubes, a flange on the cold end of the heat exchanger can be easily removed after the gasifier is cool and the producer gases have been purged from the system. If the heat exchanger tubes need cleaning, a round wire brush mounted on a long rod can be employed. This cleaning rod may be motor driven to rotate it, as with prior art. If access is required of the hot end of the heat exchanger, another flange located 180° from the gas outlet of the gasifier can be removed, without disassembly of the gasifier from the heat exchanger. This allows full access to the inside of the heat exchanger tubes, through sufficiently cool access ports to allow the use of elastomeric gasket materials. To remove deposits of heavy particles (e.g., small rocks) from the bottom of the gasifier that are not entrained into the heat exchanger, FIG. 1 shows a clean out port 110 is located in the bottom core 111 of the gasifier. This clean out port also provides access to clean the heat exchanger tubes from the hot end.

Figure 5:
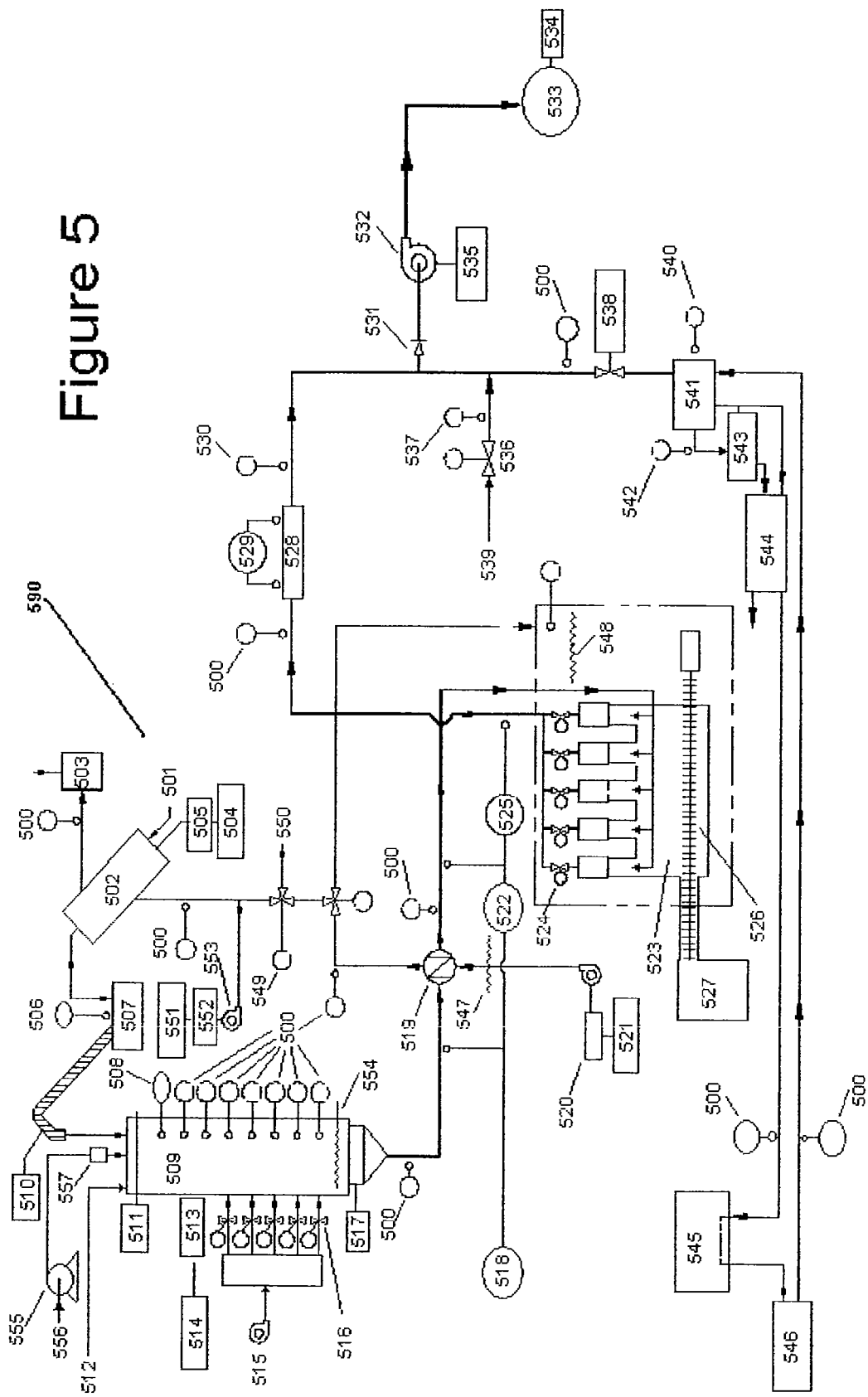
FIG. 5 provides a process diagram of a modular biopower system according to embodiments of the present invention.

FIG. 5 shows the overall arrangement and an indication of the data acquisition and control system 590, in a non-limiting embodiment. Thermocouples 500 can be used extensively throughout the system to monitor temperatures. The feed 501 to be gasified enters the dryer 502 and is moved through the dryer by a motor 505 whose speed is controlled by controller 504. A level sensor 506 near the top of the dry-feed bin 507 turns on the dryer motor as needed to keep the dry-feed bin nearly full of dried feed. A similar level sensor 508 near the top of the gasifier 509 activates the feed motor 510 to move feed from the dry-feed bin 507 into the gasifier 509. At the top of the gasifier 509 is a feed gate 511 that is kept open during gasification operations. Primary gasification air 512 also enters through the open feed gate 511. The feed gate 511 is held open by electromagnets during gasification operations. An electric vibrator 513 periodically vibrates the gasifier to settle the bed of char and fresh feed. The frequency of the vibration is controlled by a motor controller 514. An air blower 515 pressurizes a manifold that distributes the secondary gasification air to five controllable valves 516. Near the bottom of the gasifier a grate shaker 517 is periodically activated to remove char and ash from the gasifier, based on the pressure drop across the gasifier and grate measured by a pressure transducer 518.

The producer gases and entrained char are cooled as they pass through the air-cooled heat exchanger 519. The flow rate of cooling air is controlled by the speed of the blower motor 520, as controlled by the motor controller 521 through the programmable automated controller (PAC), based on the temperature of the producer gas exiting the heat exchanger 519. The pressure drop through the heat exchanger 519 is monitored with a pressure transducer 522. The cooled producer gases then enter the filter housing 523. The filter housing 523 contains a multiple of filter bags in parallel. The gas flow to each filter bag is controlled by multiple valves 524 located in the individual piping through which the gas flows from each filter bag. When this valve is closed, the filter bag goes through its cleaning cycle. A fraction of the bags are cleaned at any one time, permitting continuous operation of the system. A pressure transducer 525 monitors the pressure drop through the filters. The char and ash drops to the bottom of the filter housing 523, where it can be removed continuously by an auger 526 to a char bin 527 for disposal or sale.

The filtered gas passes through a flow meter 528 to measure the flow rate of producer gas, using data from a thermocouple and pressure transducer 529. An oxygen sensor 530 is used to detect unsafe levels of oxygen in the producer gas. A tee is used to divert gas flow either to the engine/genset 541 or through a check valve 531 to the producer-gas blower 532 to the flare 533. An igniter 534 on the flare insures that the producer gases are burned at the flare 533. A motor and motor controller 535 controls the flow producer gas going to the flare, as directed by the control computer. The producer gases going to the engine/genset 541 are controlled by the engine's governor 538 in response to the load of the engine and the manifold air pressure sensor 540. The oxygen level in the exhaust gases is monitored with an oxygen sensor 542. The signal from this oxygen sensor 542 is used to control the combustion-air 539 flow with valve 536. The flow of combustion air 539 is monitored by a flow meter 537. The hot exhaust gases pass through a catalytic converter 543 to reduce unwanted emissions, e.g., CO, hydrocarbons, and NOx. The exhaust gases are cooled in a heat exchanger 544 to recover waste heat that is combined with the waste heat recovered by the engine coolant. The hot liquid coolant is sent to the thermal load 545. Excess heat is removed from the liquid coolant by an air-cooled heat exchanger 546. Thermocouples monitor the temperature of the liquid coolant going into and coming out of the thermal load 545 and the heat exchanger 546.

During startup of this system embodiment, an electric preheater 547 heats the air entering the heat exchanger 519. The warm air exiting the heat exchanger 519 is diverted to the filter housing 523 to warm it above the dew point temperature of the producer gas. In addition, an electric preheater 548 preheats the filter housing 523. After preheating has been completed and the gasifier is operating, the hot air from the heat exchanger passes to the dryer 502 to dry the feed 501. In the event that feedstock drying is not required, a proportional valve 549 dumps the hot air 550 to the environment. Based on a thermocouple reading, tempering air is added to the hot air to reduce the temperature to below that which could excessively heat the drying biomass to avoid forming "blue haze" or possibly igniting the feed in the dryer. The flow rate of tempering air is varied by a motor controller 551 that controls the speed of the motor 552 that drives the tempering air blower 553. If the feed is very dry, water 556 is sprayed into the top of the gasifier 509 to control the pyrolysis flame front. Water 556 under pressure is supplied by a pump 555 to the spray nozzle 557.

Networked Systems

Figure 6:
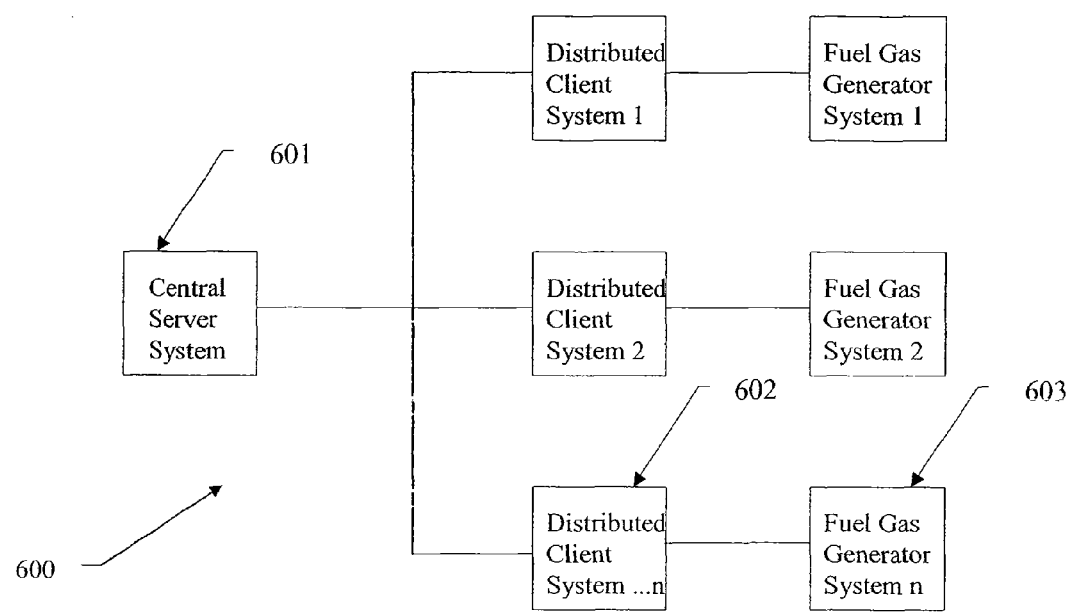
FIG. 6 illustrates an architecture for a network of biomass power generating systems according to embodiments of the present invention.
Figure 7:
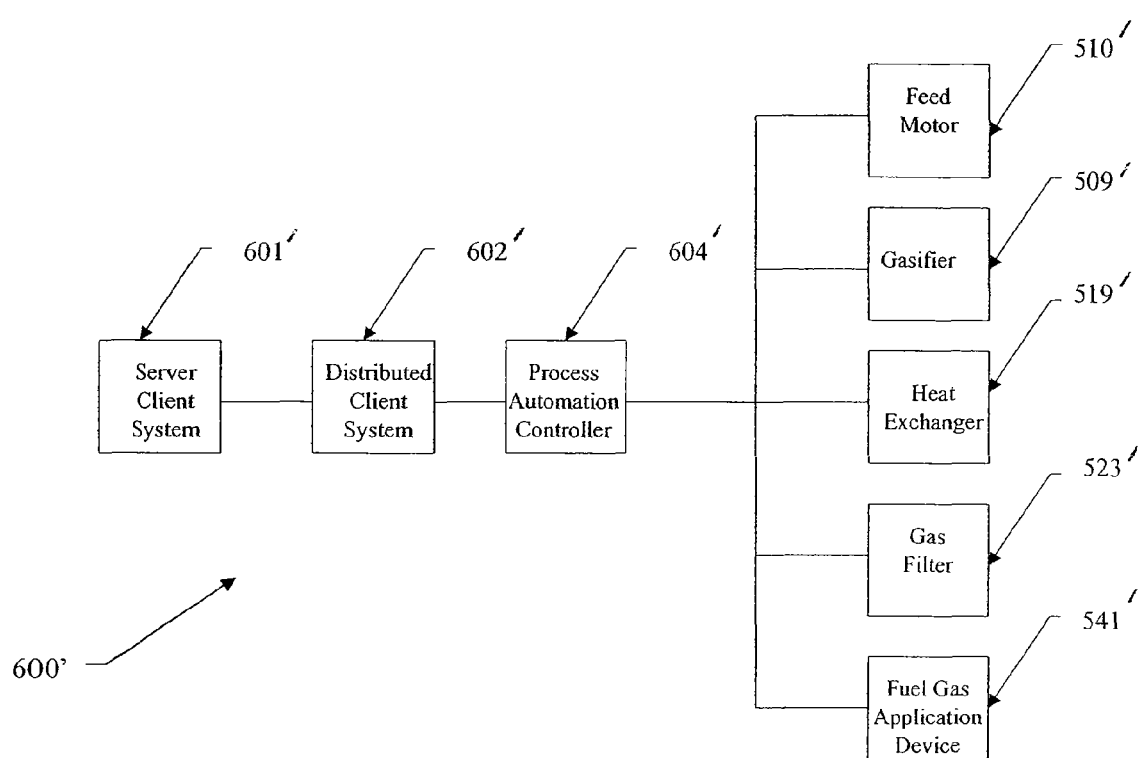
FIG. 7 depicts an architecture for a on-site distributed client system according to embodiments of the present invention.
Figure 8:
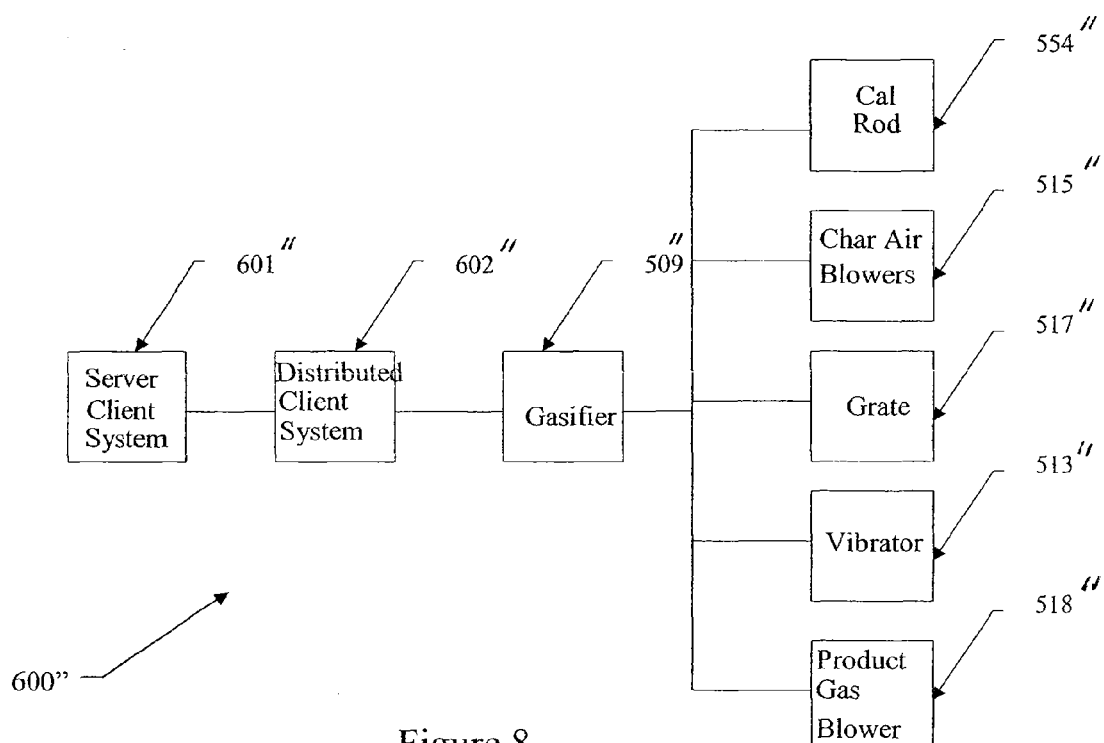
FIG. 8 depicts an architecture for a on-site distributed client system according to embodiments of the present invention.

FIG. 6 shows how a highly automated, modular, distributed architecture 600 according to some embodiments of the present invention can lend itself to operating a network of biomass power generating systems. A central server system 601 located at a distant location is able to control a distributed client system 602 via a communications system such as a wireless network or landline. Each distributed client system is in turn linked to its own on-site biomass power generating system 603. FIG. 7 shows an architecture 600' according to one embodiment of the present invention that includes an on-site distributed client system 602' linked to a server client system 601' and a process automation controller 604' that controls each of the five major modules (gasifier 509', feed motor 510', heat exchanger 519', gas filter 523', and fuel gas application device 541') that comprise a complete on-site fuel gas generator system. These modules or devices are controlled to achieve desired parameters such as temperature, pressure, power output, and the like. For example, process automation controller 604' can contain or provide instructions to adjust the location of the pyrolysis zone in response to temperatures sensed in the gasifier. This may involve changing the amount of char air going into each level of the chamber, changing the vibration schedule, and changing the grate schedule. In some embodiments, to move the location of the pyrolysis zone in the upward direction, the controller may instruct various components of the system to decrease the char air, decrease the vibration schedule, and decrease the grate operation. In some cases, use of drier wood or other feed can move the pyrolysis zone upward. Similarly, in response to moisture changes in the feed, the process automation controller can provide instructions to adjust parameters of the system so as to stabilize operation of gasifier, for example by changing the location of the pyrolysis zone. FIG. 8 shows an architecture 600" according to one embodiment of the present invention that includes a distributed client system 602" coupled with a server client system 601" that has the ability to control down to the component level, in this case five electrical devices (vibrator 513", char air blowers 515", grate 517", product gas blower 518", and cal rod 554") within the gasifier module 509". These modules or devices are controlled to achieve desired parameters such as temperature, pressure, power output, and the like, in ways similar to those described above with respect to the process automation controller. This feature may be useful for monitoring performance, and for updating algorithms in a timely manner.

Figure 9:
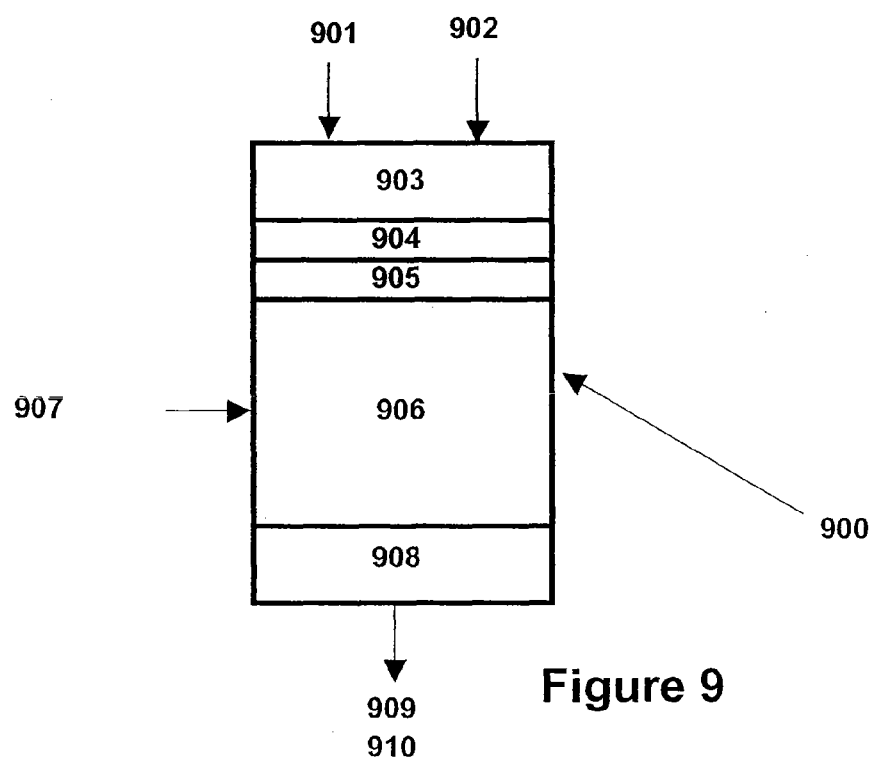
FIG. 9 illustrates a stratified downdraft gasifier according to embodiments of the present invention.

FIG. 9 provides a schematic representation of a stratified downdraft gasifier 900 according to embodiments of the present invention. The primary oxidant 901 and the feed 902 both enter the gasifier at the top, forming a layer of fresh feed 903 in the gasifier. Below the fresh feed 903 is the drying zone 904 where the feed is heated and loses water vapor to the primary combustion air. As the dried feed is heated further, it pyrolyzes and releases hot organic vapors, which are ignited and partially combusted by the primary air 901 in the flaming pyrolysis zone 905. After the feed has completely pyrolyzed to char, it enters the char oxidation zone 906, where secondary oxidant 907 is added to oxidize the char and to maintain high temperatures in the char oxidation zone 906. These temperatures are sufficiently high that some oxidation of the char is by endothermic reactions of water vapor and carbon dioxide reacting to form hydrogen and carbon monoxide. Residual tars in the gases are decomposed and oxidized in the char oxidation zone 906. It may be desirable to prevent regions in the fuel bed that are devoid of solid carbonaceous material, for example in zones 906 and 908, as such voids can disrupt temperatures and gas flows leading to dramatic increases in tar formation or even cessation of the gasification process in some instances. The produced gases 909 entrain the residual char and ash 910 to leave the bottom of the gasifier as a single stream.

EXAMPLE 1

Softwood chips were used with a nominal size of one inch (2.5 cm) in a gasifier with a 20-inch diameter and 6-inch spacing between five char-air injection levels. During the experiment, the moisture content of the air-dried chips varied between 7% and 8%. The heat exchanger and the filter were preheated for 50 minutes prior to starting to ignite the char bed.

One of the short char-air injection tubes in the lowest level of the gasifier was removed to provide an open port for ignition. While a mechanical blower was providing suction on the system and flowing air through it, a hand-held propane torch was used to ignite the char at this single char-air tube location. The char-air injection tube was then reinserted. The ignition of the char bed spread quickly upwardly and horizontally across the gasifier. The lower three char-air injection levels reached over 800° C. seven minutes after lighting the char and the woodchip feeder was then started. The flow rate of producer gas was usually held between 135 and 140 $Nm^3/h$ by the blower. During this shakedown run, the engine was started on producer gas and produced 41 $kW_e$ with the 3-phase electric generator for a short while. During much of the run, the producer gas was burned in a swirling vortex burner with a flame that was invisible in daylight.

The flows of char-air to each level were automatically adjusted by computer speed-controlled, individual blowers for each level. All 50 char-air injection tubes were equipped with a thermocouple with the junction being near the closed end of the tube in a thermowell. After steady-state was achieved, the averages of the ten temperatures measured in Level 1 (near the top) were about 750° C., in Level 2 were about 860° C., in Level 3 were about 940° C., in Level 4 were about 910° C., and in Level 5 were about 960° C. The grate temperature was about 870° C. The pressure drop through the grate remained relatively constant at less than 1 inch of water column.

The shell-and-tube heat exchanger used in this run had the conventional totally counter-current flow of cooling air in the shell, with a single entrance and exit. At 135 $Nm^3$/h of producer gas, the speed-controlled cooling blower was typically running at about 53 Hz out of a possible 60 Hz to cool the producer gas from 783° C. to 110° C. The pressure drop through the tube side of the heat exchanger remained constant at about 0.9 inches of water column. The filter system used 5 filters, with 4 active filters and the fifth filter in a cleaning cycle. The diameter of the filter bags was 18 inches and the length was 30 inches. The pressure drop through the filter system remained steady between two and three inches water column during this 3-hour test. A hand-held water misting system (a home-garden sprayer) was used to control the flame front on six occasions during this test.

The typical compositions of the dried producer gases were about 18% CO, 10% $CO_2$, 1½% methane, and 16% hydrogen, with the remainder nitrogen. Two 10-ft3 samples of gas were taken after the filter and determined to have 13 ppm and 21 ppm acetone-soluble tars and less than 10 ppm non-acetone-soluble particulates, values which are considered to be extremely low. A total of 129 kg of dry woodchips were fed over about three hours. The recovered char weighed 0.73 kg, for a yield of 0.57%.

EXAMPLE 2

Many of the parameters in this test were similar to the test of Example 1, however the engine was operated to produce electricity to satisfy a load of 49.4 $kW_e$ using 135 $Nm^3$/h of producer gas at the elevation of 5720 ft above sea level. If the engine had been at sea level, correcting for the atmospheric pressure ratio, a power output of 60.9 $kW_e$ would be expected at a correspondingly higher producer-gas flow rate.

The gasifier was ignited by removing all five of the short fingers from the lowest char-air injection level. While the producer gas blower was drawing air through the system, a hand-held propane torch was used to ignite the char bed through the five open ports that house the short char-air injection tubes. The moisture content of the wood used in this run was measured and found to vary between 9% and 14%. The dry gas composition in this run was typically 20% CO, 10% $CO_2$, 3% methane, and 18% hydrogen, with the balance nitrogen.

EXAMPLE 3

Many of the parameters in this test were similar to the test of Example 2, however only two of the short char-air injection tubes were removed for ignition with the hand-held propane torch. Ignition appeared to spread about as quickly up through the char bed, almost as if the gasifier had been ignited at five locations, instead of just two. The moisture content of the feed varied between 7 and 12% in this run. During the steady-state portion of this run, while producing 135 $Nm^3$/h of producer gas over a period of 146 minutes, 99.6 kg of dry wood chips were fed. This was a feeding rate of 40.9 kg wet wood chips/h. Based on the 49.4 $kW_e$ produced by the engine/genset in Example 2, the system requires 0.75 kg dry wood per $kW_e$h.

EXAMPLE 4

Prior to this test, an electric cal-rod had been permanently mounted through its own port in the lowest level of char-air injection tubes. After the heat exchanger and filter had been warmed up to prevent water condensation on the filter and air was flowing through the gasifier induced by a blower near the flare, the cal-rod was energized remotely and automatically by the computer to ignite the char bed. After the computer had sensed the ignition of the char-bed, the cal-rod was automatically shut off to avoid overheating it. The char bed ignited satisfactorily and feeding was started shortly thereafter.

The moisture content of the woodchips varied from 2.5% to 14.1% (wet basis). The woodchips used in this run were a mixture of aspen and Douglas fir, which occasionally contained small stones. These stones accumulated in the gasifier and on the grate, where they contributed to momentary increases in the pressure drop across the gasifier and across the grate.

By increasing the fraction of time that the reciprocating grate mechanism was activated, the system was able to return to relatively low pressure drops across the grate, apparently by breaking up the rocks until they were small enough pass through the grate. Immediately below the grate were small accumulations of small rocks about 4 mm in size or smaller, i.e. small enough to have passed through the wire-mesh grate. The pressure drop across the grate varied from 0.5 in.W.C. (when the grate appeared to be relatively free of rocks) to over 2½ in.W.C. (when the grate appeared to have accumulated rocks momentarily).

During this 48-hour run at 90 to 132 $Nm^3$/h of producer gas flow rates, the pressure drop through the heat exchanger stayed relatively constant at 0.4 to 0.8 in.W.C. and through the filter at about 1.8 and 2.9 in.W.C. The primary variable affecting the pressure drops was the flow rate of producer gas. Higher flow rates of producer gas were required when operating the water mister to control the flame front with this dry feed. The engine/genset was primarily operated to produce 39 $kW_e$ at an elevation of 5720 feet above sea level during this time, although it delivered up to 45 $kW_e$ for a short while. (Corrected to the atmospheric pressure at sea level, the engine was primarily producing the equivalent of 48 $kW_e$ during this run and up to 56 $kW_e$ for a short while.)

EXAMPLE 5

Many of the parameters in this test were similar to the test of Example 4. The woodchips in this 25-hour endurance run were relatively wet coming from the dryer and entering the gasifier they varied in moisture content between 6.4% and 33.1% (wet basis). The computer-controlled gasifier was able to automatically maintain the position of the flame front in the gasifier in the vicinity of the top level of char-air injection. The temperatures in the lower three levels of char-air injection and the grate were maintained between 800° C. and 900° C. during this run, with only momentary exceptions. The producer gas composition tended to have higher concentrations of carbon dioxide and methane than usual, but lower carbon monoxide levels. The higher methane is thought to have been caused by the slightly lower temperatures in the gasifier, due to the cooling effect of the moisture. The extra carbon dioxide appears to have been created by the water-gas shift reaction of water and carbon monoxide to make carbon dioxide and hydrogen.

Although certain system, device, and method embodiments have been disclosed herein, it will be apparent from the foregoing disclosure to those skilled in the art that variations, modifications, alternative constructions, and equivalents of such embodiments may be made without departing from the true spirit and scope of the invention. Therefore, the above description should not be taken as limiting the scope of the invention which is defined by the appended claims.

What is claimed is:

1. An automated method for converting a solid, carbonaceous material to a low tar fuel gas within a downdraft gasification reactor chamber, comprising:
   introducing the carbonaceous material into the chamber;
   transforming a first portion of the carbonaceous material into a char material at a flaming pyrolysis zone;
   controlling a plurality of temperatures along a length of the chamber by injecting oxidizing gas at more than two levels in the gasification reactor chamber, wherein:
      the oxidizing gas is injected through a plurality of injection tubes that protrude radially through the gasification reactor chamber walls into the interior of the gasification reactor chamber,
      the plurality of injection tubes protrude radially into the interior of the gasification reactor chamber at varying distances from the gasification reactor chamber walls,
      each injection tube of the plurality of injection tubes comprises a plurality of nozzles through which the oxidizing gas is delivered, and
      the plurality of injection tubes inject oxidizing as into the interior of the gasification reactor chamber at varying distances from the gasification reactor chamber walls;
   controlling an amount of the oxidizing gas injected from at least one of the more than two-levels;
   varying a location of the flaming pyrolysis zone within the chamber by increasing or decreasing an amount of oxidizing gas injected upstream or downstream of the pyrolysis zone;
   controlling a porosity of the char material and a second portion of the carbonaceous material in the gasification reactor chamber by applying at least one force to the chamber; and
   converting the char material and the second portion of the carbonaceous material to the low tar fuel gas within the gasification reactor chamber.

2. The method of claim 1, further comprising controlling a temperature and the location of the flaming pyrolysis zone to maximize tar reduction for a prescribed range of fuel gas flow rates.

3. The method of claim 1, further comprising controlling the porosity of the char material and the second portion of the carbonaceous material to maximize tar reduction with a minimum of pressure drop for a prescribed range of fuel gas flow rates.

4. The method of claim 1, wherein the carbonaceous material comprises a bulk density of greater than about 3 pounds per cubic foot.

5. The method of claim 1, wherein the carbonaceous material comprises one or more members selected from the group consisting of a woody biomass, a non-woody biomass, a cellulosic product, a cardboard, a fiber board, a paper, a plastic, and a food stuff.

6. The method of claim 1, further comprising controlling the amount of oxidizing gas injected in the gasification chamber at two or more levels with one or more variable speed fans or blowers, with one or more valves, or with one or more flow restrictors.

7. The method of claim 1, wherein applying at least one force to the chamber comprises applying a vibrational force to the chamber to collapse bridges and channels therein.

8. The method of claim 1, wherein applying at least one force to the chamber comprises moving a grate located at a downstream outlet of the gasification reactor chamber, the grate configured to crush frangible char or ash to particles that are sized to pass through a mesh screen.

9. The method of claim 1, further comprising:
   reducing the char to a particle that is sized for entrainment in the low tar fuel gas downstream of a gasification reactor chamber;
   entraining the char in the low tar fuel gas;
   passing the fuel gas and entrained char through the inside of the tubes of a shell-and-tube heat exchanger to control the temperature of the fuel gas to promote collection of tar on the surface of the entrained char such that the entrained char becomes tar laden; and
   filtering the fuel gas to remove the tar laden char particulates from the fuel gas.

10. The method of claim 9, further comprising stress relieving the individual tubes of the shell-and-tube heat exchanger through individual seals in a tube sheet.

11. The method of claim 9, wherein filtering the fuel gas comprises using a self cleaning filter, the self-cleaning filter providing for continuous operation.

12. The method of claim 1, further comprising controlling an amount of the oxidizing gas injected through the injection tubes from more than two of the plurality of levels, wherein the oxidizing gas is injected roughly uniformly throughout the gasification reactor chamber to control the temperature throughout the gasification reactor chamber and thereby allow large diameter gasification reactor chambers to be used to make a low-tar fuel gas.

13. The method of claim 1, further comprising coupling a temperature measuring device with at least one of the plurality of injection tubes.

14. The method of claim 13, wherein coupling the temperature measuring device comprises inserting the temperature measuring device into a thermowell located at one end of the at least one of the plurality of injection tubes.

15. The method of claim 1, further comprising controlling the temperature of the fuel gas to keep the fuel gas above its water dew-point temperature by controlling a pre-heating of a heat exchanger and filter system prior to igniting the gasification reactor chamber and by controlling the cooling of the fuel gas in the heat exchanger after ignition.

16. The method of claim 1, further comprising controlling the gasification reactor chamber temperatures so as to avoid the need for high temperature refractory materials.

17. The method of claim 1, wherein the plurality of injection tubes comprise a plurality of nozzles configured to deliver the oxidizing gas in a direction generally non-perpendicular to a direction of flow of the fuel gas.

18. The method of claim 17, wherein the plurality of injection tubes are removable from the gasification reactor chamber, and wherein one of the plurality of injection tubes is removed for one or more of the following reasons:
   inspection;
   maintenance;

replacement with an injection tube having a different length, a different material, a different nozzle size, or a different nozzle spacing; and igniting the carbonaceous material in the gasification reactor chamber.

19. The method of claim 2, wherein controlling the location of the flaming pyrolysis zone comprises controlling either or both of the frequency and duration of char and ash removal by a movable grate located at a downstream outlet of the gasification reactor chamber.

20. An automated method for converting a solid, carbonaceous material to a low tar fuel gas within a downdraft gasification reactor chamber, comprising:

introducing the carbonaceous material into the chamber;

transforming a first portion of the carbonaceous material into a char material at a flaming pyrolysis zone;

controlling a plurality of temperatures along a length of the chamber by injecting oxidizing gas at more than two levels in the gasification reactor chamber, wherein:

the oxidizing gas is injected through a plurality of injection tubes that protrude radially through the gasification reactor chamber walls into the interior of the gasification reactor chamber, the plurality of injection tubes protrude radially into the interior of the gasification reactor chamber at varying distances from the gasification reactor chamber walls, each injection tube of the plurality of injection tubes comprises a plurality of nozzles through which the oxidizing gas is delivered, and the plurality of injection tubes inject oxidizing gas into the interior of the gasification reactor chamber at varying distances from the gasification reactor chamber walls;

controlling an amount of the oxidizing gas injected from at least one of the more than two-levels;

varying a location of the flaming pyrolysis zone within the chamber by increasing or decreasing an amount of oxidizing gas injected upstream or downstream of the pyrolysis zone;

controlling a porosity of the char material and a second portion of the carbonaceous material in the gasification reactor chamber by applying at least one force to the chamber and the plurality of injection tubes to collapse channels and bridges within the chamber; and converting the char material and the second portion of the carbonaceous material to the low tar fuel gas within the gasification reactor chamber.

* * * * *